(12) United States Patent
Seol et al.

(10) Patent No.: US 9,154,967 B2
(45) Date of Patent: Oct. 6, 2015

(54) APPARATUS AND METHOD FOR SCHEDULING USING BEAM SCANNING IN BEAMFORMED WIRELESS COMMUNICATION SYSTEM

(75) Inventors: Ji-Yun Seol, Seongnam-si (KR); Su-Ryong Jeong, Yongin-si (KR); Tae-Young Kim, Seongnam-si (KR); Jeong-Ho Park, Seoul (KR); Hyun-Kyu Yu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 13/592,749

(22) Filed: Aug. 23, 2012

(65) Prior Publication Data

US 2013/0051364 A1 Feb. 28, 2013

(30) Foreign Application Priority Data

Aug. 23, 2011 (KR) .................... 10-2011-0083907

(51) Int. Cl.
*H04W 16/28* (2009.01)
*H04W 72/04* (2009.01)

(52) U.S. Cl.
CPC ............ *H04W 16/28* (2013.01); *H04W 72/046* (2013.01)

(58) Field of Classification Search
CPC .................................................. H04W 16/28
USPC ......................................................... 370/331
See application file for complete search history.

(56) References Cited

U.S. PATENT DOCUMENTS

| 7,333,458 | B2 * | 2/2008 | Cain ............................. 370/337 |
| 7,965,619 | B2 * | 6/2011 | Taira et al. .................... 370/203 |
| 7,970,356 | B2 * | 6/2011 | Seo et al. ..................... 455/63.4 |
| 2008/0267063 | A1 | 10/2008 | Trigui et al. |
| 2009/0312044 | A1 | 12/2009 | Hottinen |
| 2010/0272077 | A1 | 10/2010 | Van Rensburg et al. |
| 2011/0032849 | A1 | 2/2011 | Yeung et al. |
| 2011/0085448 | A1 * | 4/2011 | Kuwahara ..................... 370/242 |
| 2012/0106346 | A1 * | 5/2012 | Aguirre et al. ................ 370/237 |
| 2013/0064239 | A1 * | 3/2013 | Yu et al. ....................... 370/350 |

FOREIGN PATENT DOCUMENTS

EP          2 148 546 A1    1/2010

* cited by examiner

*Primary Examiner* — Anh-Vu Ly
*Assistant Examiner* — Abdullahi Ahmed
(74) *Attorney, Agent, or Firm* — Jefferson IP Law, LLP

(57) ABSTRACT

An apparatus and a method for beam selection and inter-beam scheduling using beam scanning in a beamformed wireless communication system are provided. A method for transmitting a signal in a transmitting stage includes transmitting a reference signal through at least one transmission beam, receiving channel information of at least one transmission beam from a receiving stage, selecting a first transmission beam for sending a signal to the receiving stage, by considering the channel information of the at least one transmission beam provided from the receiving stage, and performing inter-beam scheduling for the receiving stage by considering ID information of the first transmission beam.

30 Claims, 15 Drawing Sheets

APPARATUS AND METHOD FOR SCHEDULING USING BEAM SCANNING IN BEAMFORMED WIRELESS COMMUNICATION SYSTEM

PRIORITY

The present application claims the benefit under 35 U.S.C. §119(a) to a Korean patent application filed in the Korean Intellectual Property Office on Aug. 23, 2011, and assigned Serial No. 10-2011-0083907, the entire disclosure of which is hereby incorporated by reference.

BACKGROUND OF THE INVENTION

1. Field of the Invention

The present invention relates generally to an apparatus and a method for beam selection and inter-beam scheduling in a wireless communication system. More particularly, the present invention relates to an apparatus and a method for selecting a transmission beam to achieve optimal transmission efficiency in a wireless communication system using a beamforming technique.

2. Description of the Related Art

To meet the continuously increasing demand for wireless data traffic, wireless communication systems are advancing for supporting a high data rate. For example, to increase the data rate, the wireless communication system is under development to enhance spectral efficiency based on communication techniques such as Orthogonal Frequency Division Multiple Access (OFDMA) and Multiple Input Multiple Output (MIMO).

However, as the demand for smart phones and tablet PCs increases and accordingly applications requiring much traffic increase, the demand for the data traffic is more accelerated and thus it is hard to satisfy the wireless data traffic demand merely with the spectral efficiency enhancement. To overcome this shortcoming, a wireless communication system using an ultra-high frequency band is attracting much attention.

When supporting the wireless communication over the ultra-high frequency band, the wireless communication system is subject to the increasing propagation loss such as path loss or return loss, due to frequency properties of the ultra-high frequency. As a result, the propagation distance is shortened because of the propagation loss and the service coverage of the wireless communication system using the ultra-high frequency band is reduced.

The wireless communication system using the ultra-high frequency band can expand the service coverage by alleviating the path loss of the propagation using a beamforming technique and increasing the propagation distance. By use of the beamforming technique, a transmitting stage can form a plurality of transmission beams of different directions. A receiving stage may form a plurality of reception beams of different directions.

As such, when using the beamforming technique, the transmitting stage and the receiving stage of the wireless communication system require a method for selecting the transmission beam and the reception beam so as to achieve optimal transmission efficiency.

Therefore, a need exists for an apparatus and a method for selecting a transmission beam to achieve optimal transmission efficiency in a wireless communication system using a beamforming technique.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for selecting a transmission beam to achieve optimal transmission efficiency in a wireless communication system using a beamforming technique.

Another aspect of the present invention is to provide an apparatus and a method for selecting a transmission beam and a reception beam to achieve optimal transmission efficiency in a wireless communication system using a beamforming technique.

Yet another aspect of the present invention is to provide an apparatus and a method for transmitting a reference signal through transmission beams in a transmitting stage of a wireless communication system using a beamforming technique.

Still another aspect of the present invention is to provide an apparatus and a method for transmitting a reference signal including at least one of cell ID information, sector ID information, beam ID information, and beam load information through transmission beams in a transmitting stage of a wireless communication system using a beamforming technique.

Another aspect of the present invention is to provide an apparatus and a method for selecting an optimal transmission beam by considering channel information of transmission beams of a transmitting stage, in a receiving stage of a wireless communication system using a beamforming technique.

Another aspect of the present invention is to provide an apparatus and a method for selecting optimal reception beam and transmission beam by estimating channel information of transmission beams with respect to reception beams, in a receiving stage of a wireless communication system using a beamforming technique.

Another aspect of the present invention is to provide an apparatus and a method for selecting an optimal transmission beam by considering channel information of transmission beams and load of the transmission beams, in a receiving stage of a wireless communication system using a beamforming technique.

Another aspect of the present invention is to provide an apparatus and a method for scheduling beam change by considering ID information of an optimal transmission beam in a receiving stage of a wireless communication system using a beamforming technique.

Another aspect of the present invention is to provide an apparatus and a method for selecting an optimal transmission beam by considering channel information of transmission beams received from a receiving stage in a transmitting stage of a wireless communication system using a beamforming technique.

Another aspect of the present invention is to provide an apparatus and a method for selecting an optimal transmission beam by considering channel information of transmission beams received from a receiving stage and load of the transmission beams in a transmitting stage of a wireless communication system using a beamforming technique.

Another aspect of the present invention is to provide an apparatus and a method for selecting a transmission beam by considering channel status information of transmission beams for reception beams received from a receiving stage in a transmitting stage of a wireless communication system using a beamforming technique.

Another aspect of the present invention is to provide an apparatus and a method for scheduling beam change by considering ID information of an optimal transmission beam in a transmitting stage of a wireless communication system using a beamforming technique.

In accordance with an aspect of the present invention, a method for transmitting a signal in a transmitting stage of a wireless communication system which forms a plurality of beams is provided. The method includes transmitting a reference signal through at least one transmission beam, receiving channel information of at least one transmission beam from a receiving stage, selecting a first transmission beam for sending a signal to the receiving stage, by considering the channel information of the at least one transmission beam provided from the receiving stage, and performing inter-beam scheduling for the receiving stage by considering ID information of the first transmission beam.

In accordance with another aspect of the present invention, an apparatus of a transmitting stage of a wireless communication system which forms a plurality of beams is provided. The apparatus includes at least one antenna comprising a plurality of antenna elements, a receiver for receiving channel information of at least one transmission beam from a receiving stage, a beam setter for selecting a first transmission beam for sending a signal to the receiving stage, by considering the channel information of the at least one transmission beam provided from the receiving stage through the receiver, a controller for controlling to transmit a reference signal through at least one transmission beam, and for performing inter-beam scheduling for the receiving stage by considering ID information of the first transmission beam selected by the beam setter, and a plurality of Radio Frequency (RF) paths connected to the respective antenna elements, for forming the beam to transmit the reference signal through the at least one transmission beam and to transmit a signal to the receiving stage using the first transmission beam selected by the beam setter.

In accordance with another aspect of the present invention, a method for confirming channel information of a beam in a receiving stage of a wireless communication system which forms a plurality of beams is provided. The method includes estimating a channel of at least one transmission beam using at least one reference signal received through the at least one transmission beam, selecting a first transmission beam to be used by a transmitting stage to send a signal, by considering channel information of the at least one transmission beam, and requesting inter-beam scheduling to the transmitting stage by considering ID information of the first transmission beam.

In accordance with another aspect of the present invention, an apparatus of a receiving stage of a wireless communication system which forms a plurality of beams is provided. The apparatus includes a receiver for receiving at least one reference signal through at least one transmission beam, a channel estimator for estimating a channel of the at least one transmission beam using the at least one reference signal, and a controller for selecting a first transmission beam to be used by a transmitting stage to send a signal, by considering channel information of the at least one transmission beam, and for requesting inter-beam scheduling to the transmitting stage by considering ID information of the first transmission beam.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for beam selection and inter-beam scheduling using beam scanning in a beamformed wireless communication system.

Hereinafter, it is assumed that a cell of the wireless communication system is divided into a plurality of sectors. Yet, the technique for the beam selection and the inter-beam scheduling using the beam scanning can be equally applied to a wireless communication system not dividing the cell into the sectors.

Figure 1:
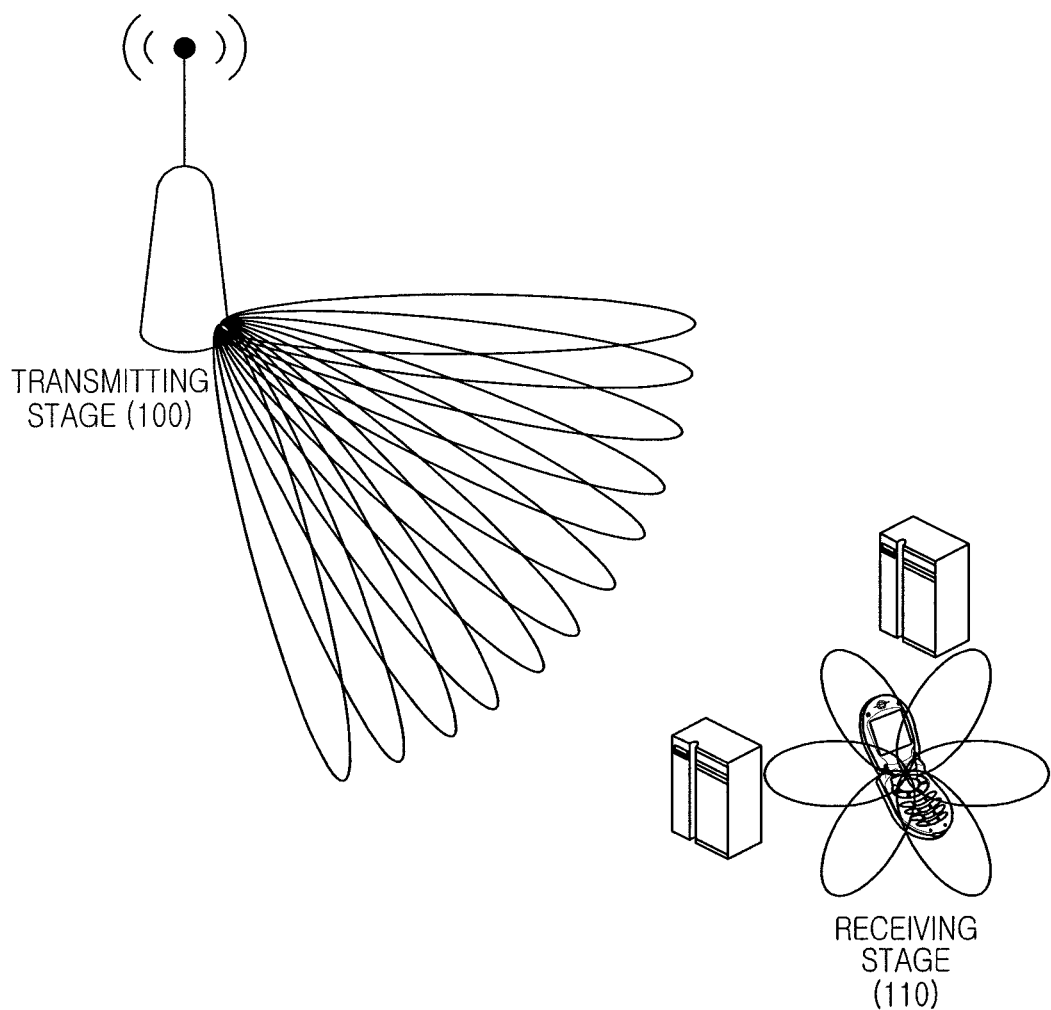
FIG. 1 illustrates transmission beams of a transmitting stage and reception beams of a receiving stage in a wireless communication system according to an exemplary embodiment of the present invention.

Using a beamforming technique, a transmitting stage supports a plurality of beams of different directions as shown in FIG. 1. A receiving stage does not form its reception beam or may form at least one reception beam of different directions. Herein, the transmitting stage, which transmits a signal, includes a base station or a mobile station, and the receiving stage, which receives the signal from the transmitting stage, includes a mobile station or a base station.

Figure 2:
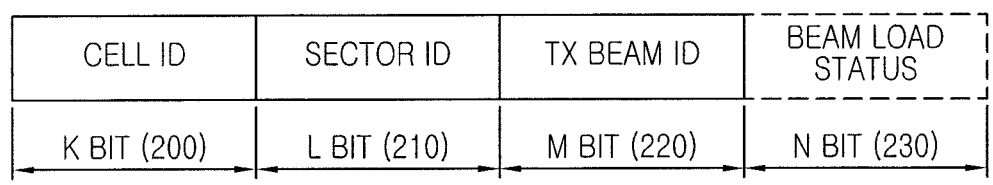
FIG. 2 illustrates a reference signal identifier according to an exemplary embodiment of the present invention.

FIG. 1 depicts transmission beams of a transmitting stage and reception beams of a receiving stage in a wireless communication system according to an exemplary embodiment of the present invention. FIG. 2 illustrates a reference signal identifier according to an exemplary embodiment of the present invention.

Referring to FIG. 1, a transmitting stage 100 supports a plurality of beams of different directions.

The transmitting stage 100 transmits a reference signal over the supportable beams. For example, when a cell of the transmitting stage 100 is divided into a plurality of sectors, the reference signal includes cell ID information 200, sector ID information 210, beam ID information 220, and beam load information 230 as shown in FIG. 2. For example, when the cell of the transmitting stage 100 is not divided into the sectors, the reference signal may include the cell ID information 200, the beam ID information 220, and the beam load information 230. Herein, the reference signal indicates a signal transmitted by the transmitting stage over the transmission beams so that the receiving stage can select a transmission beam for sending and receiving signals to and from the transmitting stage. The load information 230 in the reference signal can include load information of the transmission beams using a plurality of quantized values such as high/medium/low or high/low.

The receiving stage 110 estimates a channel of each transmission beam using the reference signal of the transmission beam received from the transmitting stage 100. For example, when the receiving stage 110 does not support the reception beamforming, the receiving stage 110 estimates the channel of each transmission beam using the reference signal of the transmission beam received from the transmitting stage 100. For example, when supporting the reception beamforming, the receiving stage 110 may estimate the channel of the transmission beam per reception beam.

Next, the receiving stage 110 feeds channel information of each transmission beam back to the transmitting stage 100. For example, the receiving stage 110 feeds the channel information of every estimated transmission beam back to the transmitting stage 100. For example, the receiving stage 110 can feed the channel information of M-ary transmission beams of good channel condition, back to the transmitting stage 100. For example, the receiving stage 110 may feed the channel information of P-ary transmission beams having the channel condition meeting reference criteria for selection, back to the transmitting stage 100. Herein, the channel condition corresponds to conditions on channel information including at least one of a Signal to Noise Ratio (SNR), a Carrier power Interference and Noise power Ratio (CINR), and a Receive Signal Strength Indicator (RSSI). When the receiving stage 110 supports the reception beamforming, the receiving stage 110 feeds channel status information of the transmission beams for the respective reception beams, back to the transmitting stage 100.

Either the transmitting stage 100 or the receiving stage 110 selects the transmission beam for communicating with the other node using the channel information of the transmission beam estimated by the receiving stage 110. For example, either the transmitting stage 100 or the receiving stage 110 selects the transmission beam for communicating with the other node using the channel information of the transmission beam estimated by the receiving stage 110 and the load information of each transmission beam. For example, when the receiving stage 110 supports the reception beamforming, either the transmitting stage 100 or the receiving stage 110 selects the transmission beam and the reception beam for communicating with the other node using the channel information of the transmission beam estimated by the receiving stage 110 for each reception beam.

Figure 3A:
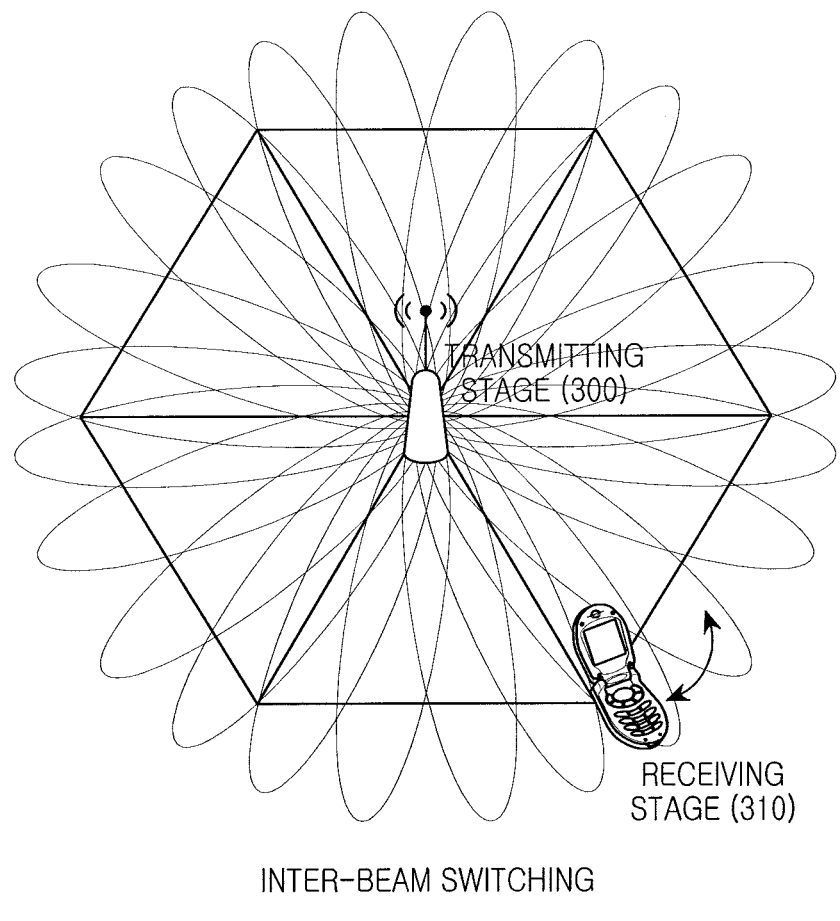
FIGS. 3A, 3B, and 3C illustrate inter-beam scheduling according to beam selection in a wireless communication system according to an exemplary embodiment of the present invention.
Figure 3B:
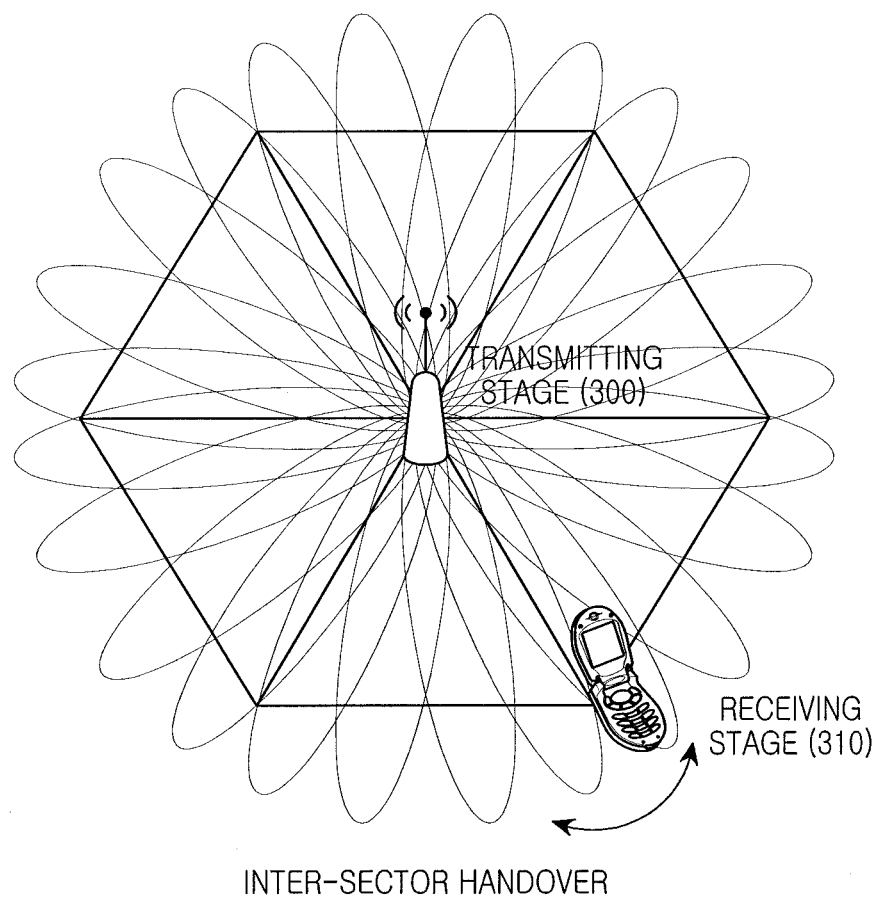
Figure 3C:
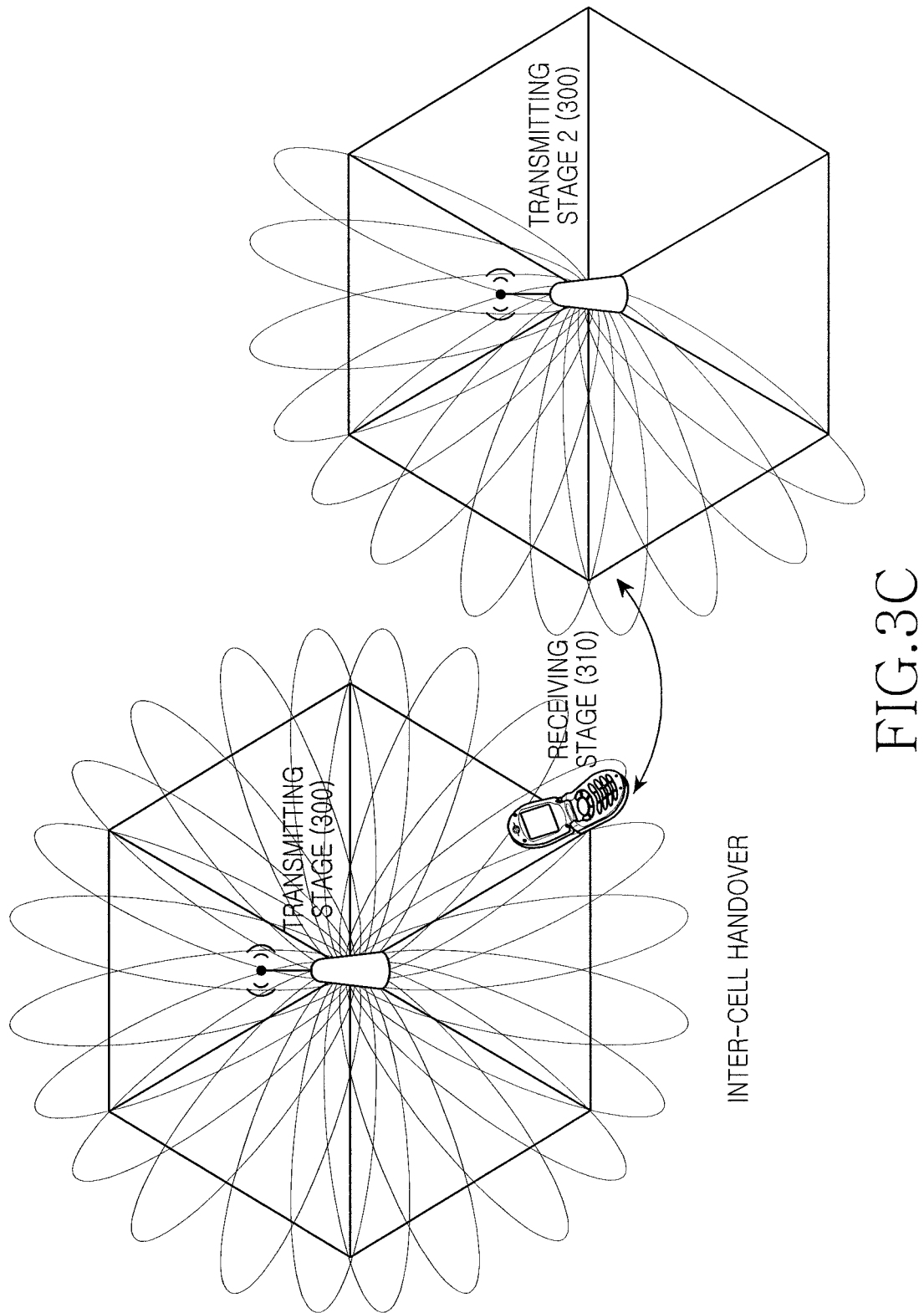

FIGS. 3A-3C illustrate inter-beam scheduling according to a beam selection in a wireless communication system according to an exemplary embodiment of the present invention.

The node (e.g., the transmitting stage 100 or the receiving stage 110) selecting the transmission beam can obtain the cell, sector, and beam ID information of the selected transmission beam from the reference signal of the selected transmission beam. Hence, the transmitting stage 100 and the receiving stage 110 perform inter-beam scheduling according to the cell, sector, and beam ID information of the selected transmission beam. For example, referring to FIG. 3A, when the transmission beam selected by the transmitting stage 300 or the receiving stage 310 belongs to the same cell and the same sector as the transmission beam used by the transmitting stage 300 and the receiving stage 310, the transmitting stage 300 and the receiving stage 310 perform intra-sector inter-beam switching. For example, referring to FIG. 3B, when the transmission beam selected by the transmitting stage 300 or the receiving stage 310 belongs to a different sector of the same cell as the transmission beam used by the transmitting stage 300 and the receiving stage 310, the transmitting stage 300 and the receiving stage 310 perform intra-cell inter-sector handover. For example, referring to FIG. 3C, when the transmission beam selected by the transmitting stage 300 or the receiving stage 310 belongs to a different cell from the transmission beam used by the transmitting stage 300 and the receiving stage 310, the transmitting stage 300 and the receiving stage 310 perform inter-cell handover.

As such, the receiving stage 110 estimates the channel of each transmission beam using the reference signal of the transmission beam received from the transmitting stage 100. In so doing, the receiving stage 110 can identify the cell, the sector, and the beam of the reference signal using the ID information of the reference signal. Hence, the receiving stage 110 manages the channel information of the transmission beam on the cell basis and on the sector basis. When the receiving stage 110 supports the reception beamforming, the receiving stage 110 may manage the channel information of the transmission beam on the cell basis and on the sector basis per reception beam.

Now, the transmitting stage for forming the transmission beam is explained. Hereafter, the transmitting stage is assumed to select the optimal transmission beam for sending and receiving signals to and from the receiving stage, using the channel information of the transmission beams received from the receiving stage.

Figure 4:
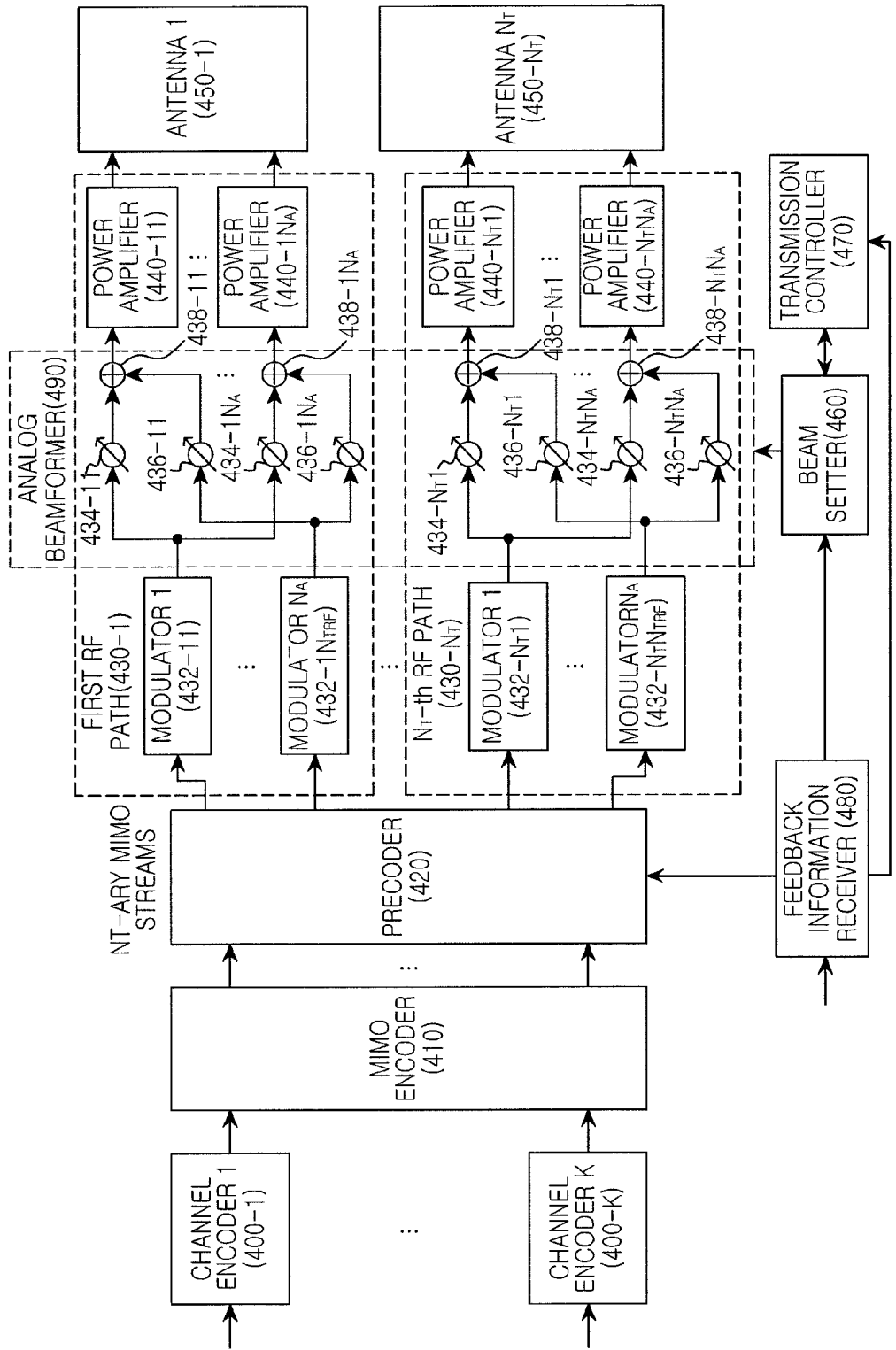
FIG. 4 is a block diagram that illustrates a transmitting stage for forming a transmission beam according to an exemplary embodiment of the present invention.

FIG. 4 is a block diagram that illustrates a transmitting stage for forming a transmission beam according to an exemplary embodiment of the present invention. Herein, the transmitting stage is assumed to employ digital/analog hybrid beamforming.

Referring to FIG. 4, the transmitting stage includes K-ary channel encoders 400-1 through 400-K, a Multiple Input Multiple Output (MIMO) encoder 410, a precoder 420, NT-ary Radio Frequency (RF) paths 430-1 through 430-NT, NT-ary sub-array antennas 450-1 through 450-NT, a beam setter 460, a transmission controller 470, and a feedback information receiver 480.

The K-ary channel encoders 400-1 through 400-K each include a channel encoder for encoding and outputting a signal to transmit to the receiving stage.

The MIMO encoder 410 multiplexes the modulated signals fed from the K-ary channel encoders 400-1 through 400-K, to signals to transmit through M-ary streams in order to send the signals over the NT-ary sub-array antennas 450-1 through 450-NT.

The precoder 420 precodes the M-ary signals fed from the MIMO encoder 410 to apply the digital beamforming and provides the precoded signals to the RF paths 430-1 through 430-NT respectively.

The NT-ary RF paths 430-1 through 430-NT each process the signals fed from the precoder 420 in order to output the signals through the corresponding sub-array antennas 450-1 through 450-NT. In so doing, the NT-ary RF paths 430-1 through 430-NT are constructed identically. Thus, the first RF path 430-1 is explained here. The other NT-ary RF paths 430-2 through 430-NT are constructed the same as the first RF path 430-1.

The first RF path 430-1 includes a modulator 432-11 through 432-1NTRF, connected to an analog beamformer 490, and NA-ary power amplifiers 440-11 through 440-1NA. Herein, the NA denotes the number of antenna elements constituting the first antenna 450-1. The number of modulator (NTRF) per sub-array antenna group may be or may not be same with the number of antenna elements (NA) per sub-array antenna.

The modulators 432-11 through 432-1NTRF each modulate and output the signal fed from the precoder 420 according to the communication scheme. For example, the NTRF-ary modulators 432-11 through 432-1NTRF each include an Inverse Fast Fourier Transform (IFFT) operator and a Digital to Analog Converter (DAC). The IFFT operator converts the signal output from the precoder 420 to a time-domain signal using IFFT. The DAC converts the time-domain signal output from the IFFT operator to an analog signal. Herein, the each of NTRF-ary modulators 432-11 through 432-1NTRF may further include a Parallel-to-Serial converter(P/S) and a CP(Cyclic Prefix) adder.

The analog beamformer 490 shifts and outputs a phase of the NT NTRF-ary transmit signals output from the NT NTRF-ary modulators 432-11 through 432-1NT NTRF according to a transmission beam weight provided from the beam setter 460. For example, the analog beamformer 490 includes a plurality of phase shifters 434-11 through 434-1NA and 436-11 through 436-1NA, and combiners 438-11 through 438-1NA. The NTRF-ary modulators 432-11 through 432-1NTRF each split the output signal to NA-ary signals and output the NA-ary signals to the respective phase shifters 434-11 through 434-1NA and 436-11 through 436-1NA. The phase shifters 434-11 through 434-1NA and 436-11 through 436-1NA change the phase of the signals output from the NA-ary modulators 432-11 through 432-1NA according to the transmission beam weight provided from the beam setter 460. The combiners 438-11 through 438-1NA combines the output signals of the phase shifters 434-11 through 434-1NA and 436-11 through 436-1NA corresponding to the antenna elements.

The power amplifiers 440-11 through 440-1NA each amplify the power of the signal output from the combiners 438-11 through 438-1NA and output the amplified signal to the outside through the first antenna 450-1.

The beam setter 460 selects the transmission beam to be used to transmit the signal, and provides the transmission beam weight according to the selected transmission beam to the analog beamformer 490 under control of the transmission controller 470. For example, the beam setter 460 provides the analog beamformer 490 with the transmission beam weight according to the transmission beam for carrying the reference signal under the control of the transmission controller 470. In so doing, the reference signal includes at least one of the cell ID information 200, the sector ID information 210, the beam ID information 220, and the beam load information 230 as shown in FIG. 2. For example, the beam setter 460 selects the transmission beam for achieving the optimal transmission efficiency with the receiving stage by considering the channel information of the transmission beams provided from the feedback information receiver 480 under the control of the transmission controller 470. For example, the beam setter 460 may select the transmission beam for achieving the optimal transmission efficiency with the receiving stage by considering the channel information of the transmission beams provided from the feedback information receiver 480 and the load information of the transmission beams under the control of the transmission controller 470. For example, the beam setter 460 may select the transmission beam for the reception beam to achieve the optimal transmission efficiency with the receiving stage by considering the channel information of the transmission beams for the reception beams provided from the feedback information receiver 480 under the control of the transmission controller 470. For example, the beam setter 460 may select the transmission beam for the reception beam to achieve the optimal transmission efficiency with the receiving stage by considering the channel information of the transmission beams for the reception beams provided from the feedback information receiver 480 and the load information of the transmission beams under the control of the transmission controller 470.

The transmission controller 470 controls the beam setter 460 to select the transmission beam so as to form the transmission beam. For example, the transmission controller 470 controls the beam setter 460 to send the reference signal over the transmission beams supported by the transmitting stage. For example, the transmission controller 470 may control the beam setter 460 to select the optimal transmission beam by taking into account at least one of the channel information of the transmission beams provided from the feedback controller 480 and the load information of the transmission beams.

The transmission controller 470 performs the inter-beam scheduling by considering the ID information of the optimal transmission beam selected by the beam setter 460. For example, when the transmission beam selected by the beam setter 460 belongs to the same cell and the same sector as the transmission beam being used by the transmitting stage and the receiving stage, the transmission controller 470 control to perform the intra-sector inter-beam switching as shown in FIG. 3A. For example, when the transmission beam selected by the beam setter 460 belongs to the different sector of the same cell as the transmission beam used by the transmitting stage and the receiving stage, the transmission controller 470 can control to perform the intra-cell inter-sector handover as shown in FIG. 3B. For example, when the transmission beam selected by the beam setter 460 belongs to the different cell from the transmission beam used by the transmitting stage and the receiving stage, the transmission controller 470 may control to perform the inter-cell handover as shown in FIG. 3C.

The feedback information receiver 480 receives the information fed back from the receiving stage and outputs the received information to the precoder 420, the beam setter 460, and the transmission controller 470.

In this exemplary embodiment, the transmitting stage can select the transmission beam of the optimal transmission efficiency with the receiving stage using the channel information of the transmission beams provided from the receiving stage, or select the optimal transmission beam by considering the number of the allocated mobile stations for the available resources per beam.

Alternatively, the transmitting stage may receive the optimal transmission beam selected by the receiving stage, from the receiving stage. In this case, the beam setter 460 provides the transmission beam weight according to the optimal transmission beam selected by the receiving stage, to the analog beamformer 490. The transmission controller 470 performs the inter-beam scheduling according to the request by the receiving stage.

In this exemplary embodiment, the RF path includes the modulators, the analog beamformer, and power amplifiers.

Alternatively, each modulator may called as the RF path, and, in this case, the analog beamformer and power amplifiers may be separated as another block(s) from the RF path.

Hereafter, a structure of the receiving stage for supporting the reception beamforming is explained.

Figure 5:
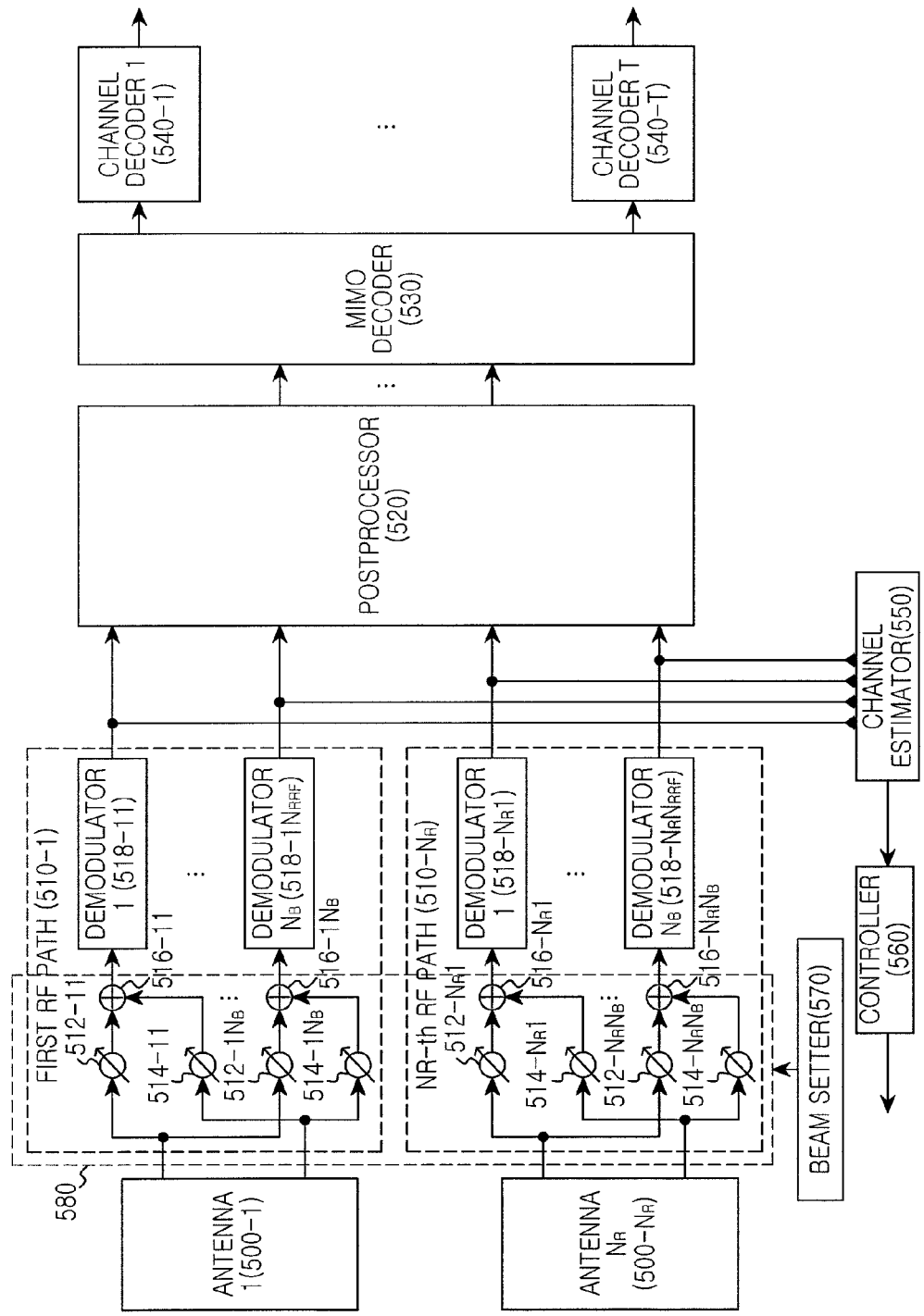
FIG. 5 is a block diagram that illustrates a receiving stage for forming a reception beam according to an exemplary embodiment of the present invention.

FIG. 5 is a block diagram that illustrates a receiving stage for forming a reception beam according to an exemplary embodiment of the present invention. Herein, the receiving stage is assumed to adopt the digital/analog hybrid beamforming.

Referring to FIG. 5, a receiving stage includes NR-ary sub-array antennas 500-1 through 500-NR, NR-ary RF paths 510-1 through 510-NR, a postprocessor 520, a MIMO decoder 530, T-ary channel decoders 540-1 through 540-T, a channel estimator 550, a feedback controller 560, and a beam setter 570.

The NR-ary RF paths 510-1 through 510-NR process the signals received via the corresponding sub-array antennas 500-1 through 500-NR. The NR-ary RF paths 510-1 through 510-NR are constructed identically. Accordingly, the structure of the first RF path 510-1 is mainly described. The other RF paths 510-2 through 510-NR are constructed the same as the first RF path 510-1.

The first RF path 510-1 includes an analog beamformer 580 and a demodulator 518-11 through 518-1NRRF. Herein, the NB denotes the number of antenna elements constituting the first antenna 500-1. The number of modulator (NRRF) per sub-array antenna group may be or may not be same with the number of antenna elements (NB) per sub-array antenna.

The analog beamformer 580 shifts and outputs a phase of the NB-ary receive signals output from the antenna elements of the first antenna 500-1 according to a transmission beam weight provided from the beam setter 570. For example, the analog beamformer 580 includes a plurality of phase shifters 512-11 through 512-1NB and 514-11 through 514-1NB, and combiners 516-11 through 516-1NB. The antenna elements of the first antenna 500-1 split the receive signal to NB-ary signals and output them to the respective phase shifters 512-11 through 512-1NB and 514-11 through 514-1NB. The phase shifters 512-11 through 512-1NB and 514-11 through 514-1NB change the phase of the signals output from the antenna elements of the first antenna 500-1 according to a reception beam weight provided from the beam setter 570. The combiners 516-11 through 516-1NB combines the output signals of the phase shifters 512-11 through 512-1NB and 514-11 through 514-1NB corresponding to the antenna elements.

The demodulators 518-11 through 518-1NRRF demodulate and output the receive signals fed from the combiners 516-11 through 516-1NB according to the communication scheme. For example, the demodulators 518-11 through 518-1NRRF each include an Analog to Digital Converter (ADC) and a FFT operator. The ADC converts the receive signal fed from the combiners 516-11 through 516-1NB to a digital signal. The FFT operator converts the signal fed from the ADC to a frequency-domain signal using FFT. Herein, the each of NRRF-ary modulators 518-11 through 518-1NRRF may further include and a CP(Cyclic Prefix) remover and a Serial-to-Parallel converter(S/P).

The postprocessor 520 post-decodes the signals fed from the NR-ary RF paths 510-1 through 510-NR according to the precoding scheme of the transmitting stage, and provides the post-decoded signals to the MIMO decoder 530.

The MIMO decoder 530 multiplexes the M-ary receive signals output from the postprocessor 520 to T-ary signals so that the T-ary channel decoders 540-1 through 540-T can decode the signals.

The T-ary channel decoders 540-1 through 540-T each include a channel decoder for decoding the signal received from the transmitting stage.

The channel estimator 550 estimates the channel information of the transmission beams based on the reference signal transmitted from the transmitting stage over the transmission beams. When the receiving stage supports the reception beamforming, the channel estimator 550 estimates the channel information of the transmission beams per reception beam supported by the receiving stage. When a scan event occurs, the channel estimator 550 estimates the channel information of the transmission beams. Herein, the channel information includes at least one of a Signal to Noise Ratio (SNR), a Carrier power to Interference and Noise power Ratio (CINR), and a Receive Signal Strength Indicator (RSSI).

The controller 560 feeds the channel information of the transmission beams estimated by the channel estimator 550, back to the transmitting stage. For example, the controller 560 feeds the channel information of the M-ary transmission beams of the good channel status, back to the transmitting stage. For example, the controller 560 can feed the channel information of the P-ary transmission beams of the channel status meeting the reference criteria, back to the transmitting stage. For example, when the receiving stage supports the reception beamforming, the controller 560 may feed the channel information of the M-ary transmission beams of good channel condition per reception beam, back to the transmitting stage. For example, when the receiving stage supports the reception beamforming, the controller 560 may feed the channel information of the P-ary transmission beams having the channel condition meeting the reference criteria per reception beam, back to the transmitting stage.

By considering the channel information of the transmission beams estimated by the channel estimator 550, the controller 560 may select the transmission beam for achieving the optimal transmission efficiency with the transmitting stage. For example, the controller 560 selects the transmission beam for achieving the optimal spectral efficiency (for instance, maximizing the achievable channel capacity, maximizing received SNR(Signal-to-Noise Ratio), or minimizing bit/packet error rate) with the transmitting stage by considering the channel information of the transmission beams estimated by the channel estimator 550. For example, the controller 560 may select the transmission beam for achieving the optimal spectral efficiency with the transmitting stage by considering the channel information of the transmission beams estimated by the channel estimator 550 and the load information of the transmission beams. For example, the controller 560 may select the transmission beam for the reception beam to achieve the optimal spectral efficiency with the transmitting stage by considering the channel information of the transmission beams estimated by the channel estimator 550 for the reception beams. For example, the controller 560 may select the transmission beam for the reception beam to achieve the optimal spectral efficiency with the transmitting stage by considering the channel information of the transmission beams estimated by the channel estimator 550 for the reception beams and the load information of the transmission beams.

The controller 560 may request the inter-beam scheduling by considering the ID information of the transmission beam for achieving the optimal spectral efficiency with the transmitting stage. For example, when the transmission beam selected by the controller 560 is different from the transmission beam previously being used by the transmitting stage and the receiving stage, and belongs to the same cell and the same sector as the transmission beam being used by the transmitting stage and the receiving stage, the controller 560 requests the intra-sector inter-beam switching to the transmitting stage as shown in FIG. 3A. For example, when the transmission beam selected by the controller 560 belongs to the different sector of the same cell as the transmission beam being used by the transmitting stage and the receiving stage, the controller 560 may request the intra-cell inter-sector handover to the transmitting stage as shown in FIG. 3B. For example, when the transmission beam selected by the controller 560 belongs to the different cell from the transmission beam being used by the transmitting stage and the receiving stage, the controller 560 may request the inter-cell handover to the transmitting stage as shown in FIG. 3C.

The beam setter 570 provides the reception beam weight to the analog beamformer 580 so as to receive the signal along the reception beam corresponding to the transmission beam, where the reception beam is selected by the transmitting stage or the controller 560 among the plurality of the supportable reception beams.

In this exemplary embodiment, the RF path includes the analog beamformer and the modulators.

Alternatively, each modulator may called as the RF path, and, in this case, the analog beamformer may be separated as another block(s) from the RF path.

As stated above, the transmitting stage and the receiving stage perform the inter-beam scheduling according to the ID information of the cell, the sector, and the beam of the optimal transmission beam. When the receiving stage selects the optimal transmission beam and requests the inter-beam scheduling to the transmitting stage, the wireless communication system operates as shown in FIG. 6.

Figure 6:
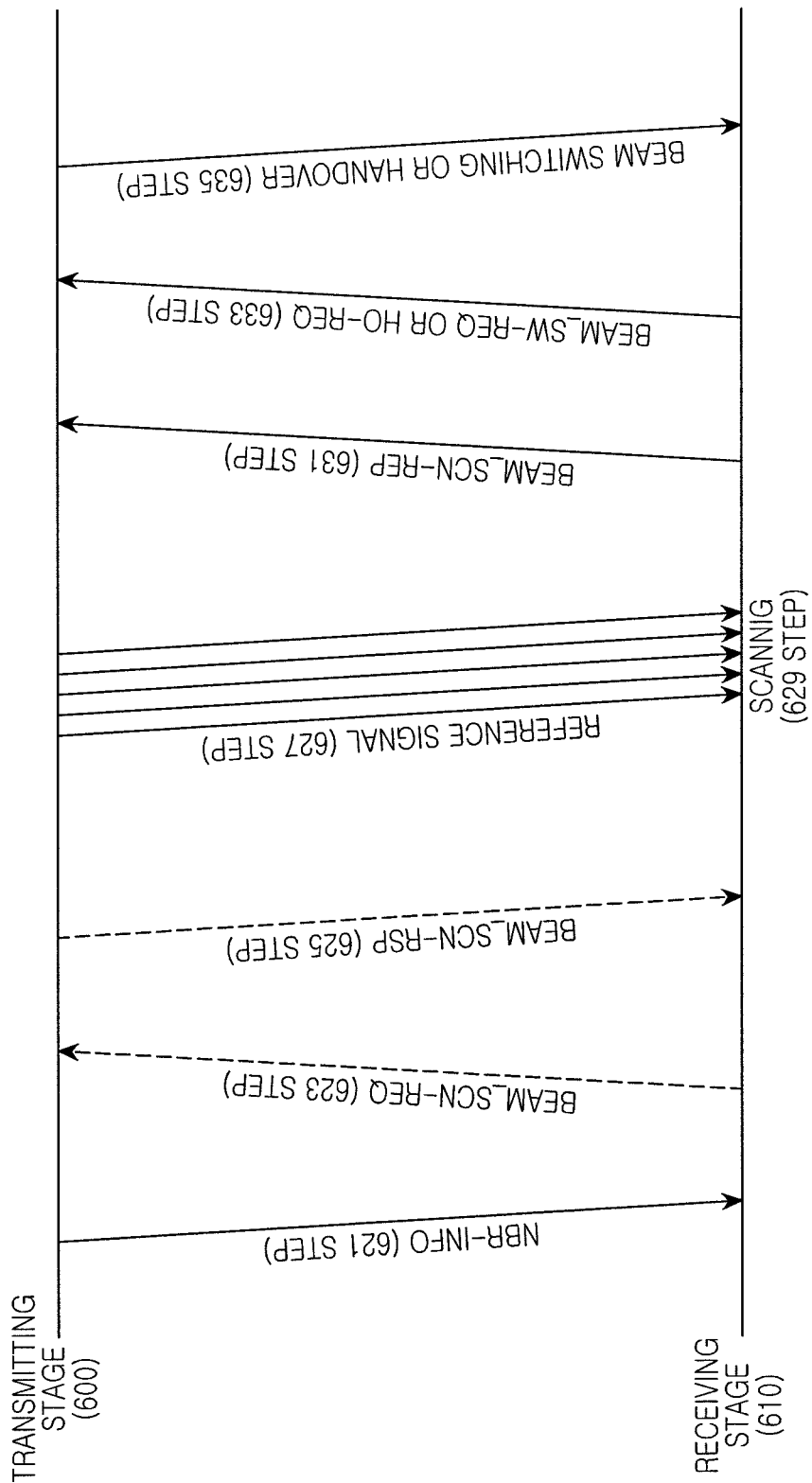
FIG. 6 illustrates a method for selecting an optimal beam and changing a beam in a wireless communication system according to an exemplary embodiment of the present invention.

FIG. 6 illustrates a method for selecting an optimal beam and changing a beam in a wireless communication system according to an exemplary embodiment of the present invention. Herein, the receiving stage is assumed to negotiate with the transmitting stage about scan information.

Referring to FIG. 6, to support the scanning of a receiving stage 610, a transmitting stage 600 sends a message NBR-INFO including neighboring transmitting stage information in step 621. In so doing, the transmitting stage 600 broadcasts the message including the neighboring transmitting stage information.

When the scan event occurs, the receiving stage 610 sends a scan request message Beam_SCAN-REQ to the transmitting stage 600 in step 623. The transmitting stage 600 sends a response message Beam_SCAN-RSP to the receiving stage 610 in response to the scan request of the receiving stage 610 in step 625. Using the scan request message and the scan response message, the receiving stage 610 and the transmitting stage 600 exchange scanning profile information.

The transmitting stage 600 transmits the reference signal through the supportable transmission beams in step 627. Herein, the reference signal includes at least one of the cell ID information 200, the sector ID information 210, the beam ID information 220, and the beam load information 230 as shown in FIG. 2.

The receiving stage 610 estimates the channel status (or channel quality) of the transmission beams according to the scan information negotiated with the transmitting stage 600 by receiving the reference signal from the transmitting stage 600 through the transmission beams in step 629. When the receiving stage 610 supports the reception beamforming, the receiving stage 610 estimates the channel information (channel status or channel quality) of the transmission beams of the transmitting stage per reception beam supportable.

In step 631, the receiving stage 610 sends a report message Beam_SCAN-REP of the channel information of the transmission beams to the transmitting stage 600.

The receiving stage 610 selects the transmission beam for achieving the optimal spectral efficiency with the transmitting stage by considering the channel information of the transmission beams. For example, the receiving stage 610 selects the transmission beam for achieving the optimal spectral efficiency with the transmitting stage 600 by considering the channel information and the load information of the transmission beams. For example, when the receiving stage 610 supports the reception beamforming, the receiving stage 610 can select the transmission beam for the reception beam to achieve the optimal spectral efficiency with the transmitting stage 600 by considering the channel information of the transmission beams for the reception beams. For example, when the receiving stage 610 supports the reception beamforming, the receiving stage 610 may select the transmission beam for the reception beam to achieve the optimal spectral efficiency with the transmitting stage 600 by considering the channel information and the load information of the transmission beams with respect to the reception beams. In so doing, the receiving stage 610 can obtain the load information of the transmission beam by considering the load information in the reference signal.

In step 633, the receiving stage 610 requests the inter-beam scheduling by considering the ID information of the optimal transmission beam. For example, when the transmission beam selected by the receiving stage 610 is different from the transmission beam previously being used by the transmitting stage and the receiving stage, and belongs to the same cell and the same sector as the transmission beam being used by the transmitting stage 600 and the receiving stage 610, the receiving stage 610 requests the intra-sector inter-beam switching to the transmitting stage 600 as shown in FIG. 3A. For example, when the transmission beam selected by the receiving stage 610 belongs to the different sector of the same cell as the transmission beam being used by the transmitting stage 600 and the receiving stage 610, the receiving stage 610 can request the intra-cell inter-sector handover to the transmitting stage 600 as shown in FIG. 3B. For example, when the transmission beam selected by the receiving stage 610 belongs to the different cell from the transmission beam being used by the transmitting stage 600 and the receiving stage 610, the receiving stage 610 may request the inter-cell handover to the transmitting stage 600 as shown in FIG. 3C.

In step 635, the transmitting stage 600 performs the inter-beam scheduling of the receiving stage 610 according to the inter-beam scheduling request of the receiving stage 610.

Figure 7:
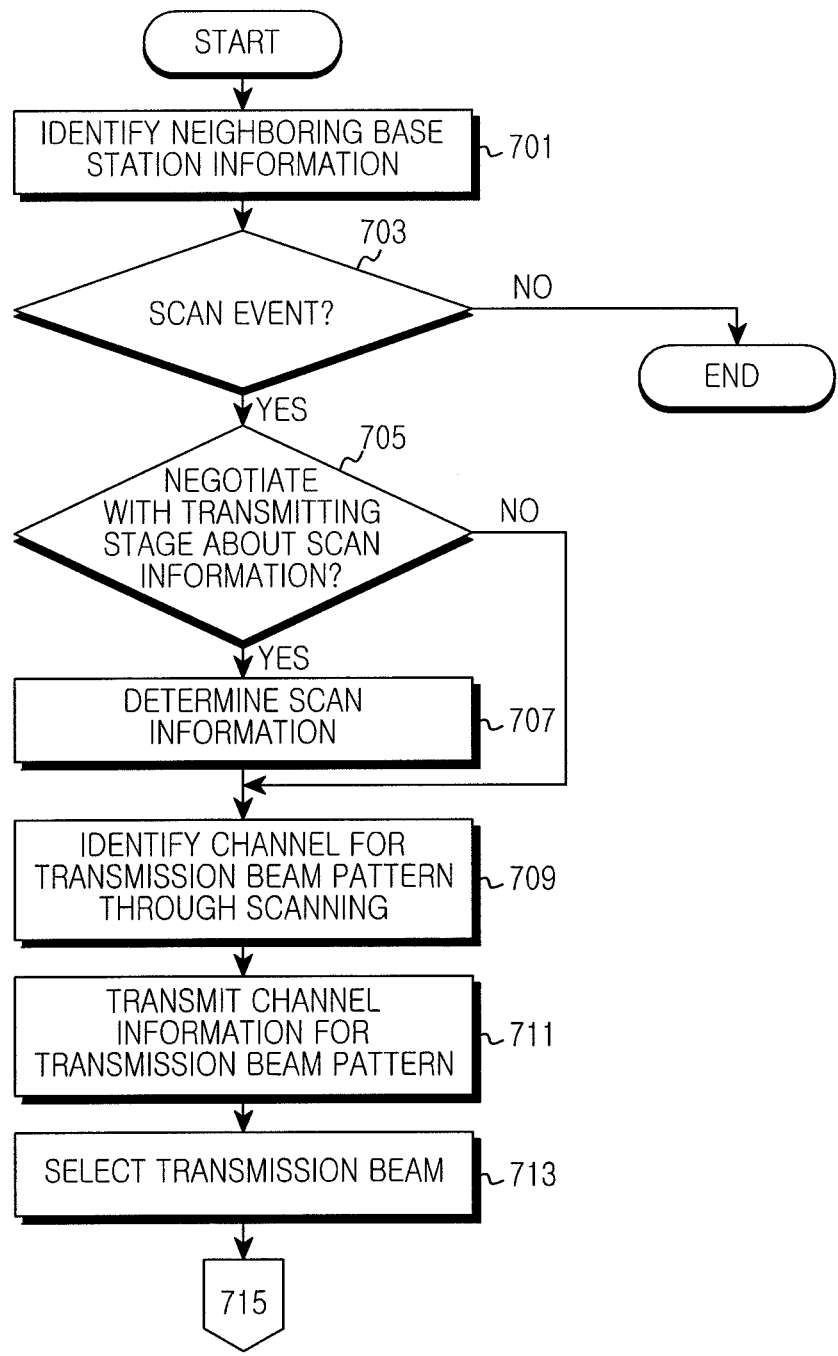
FIG. 7 illustrates a method for selecting an optimal beam in the receiving stage of a wireless communication system according to an exemplary embodiment of the present invention.
Figure 8:
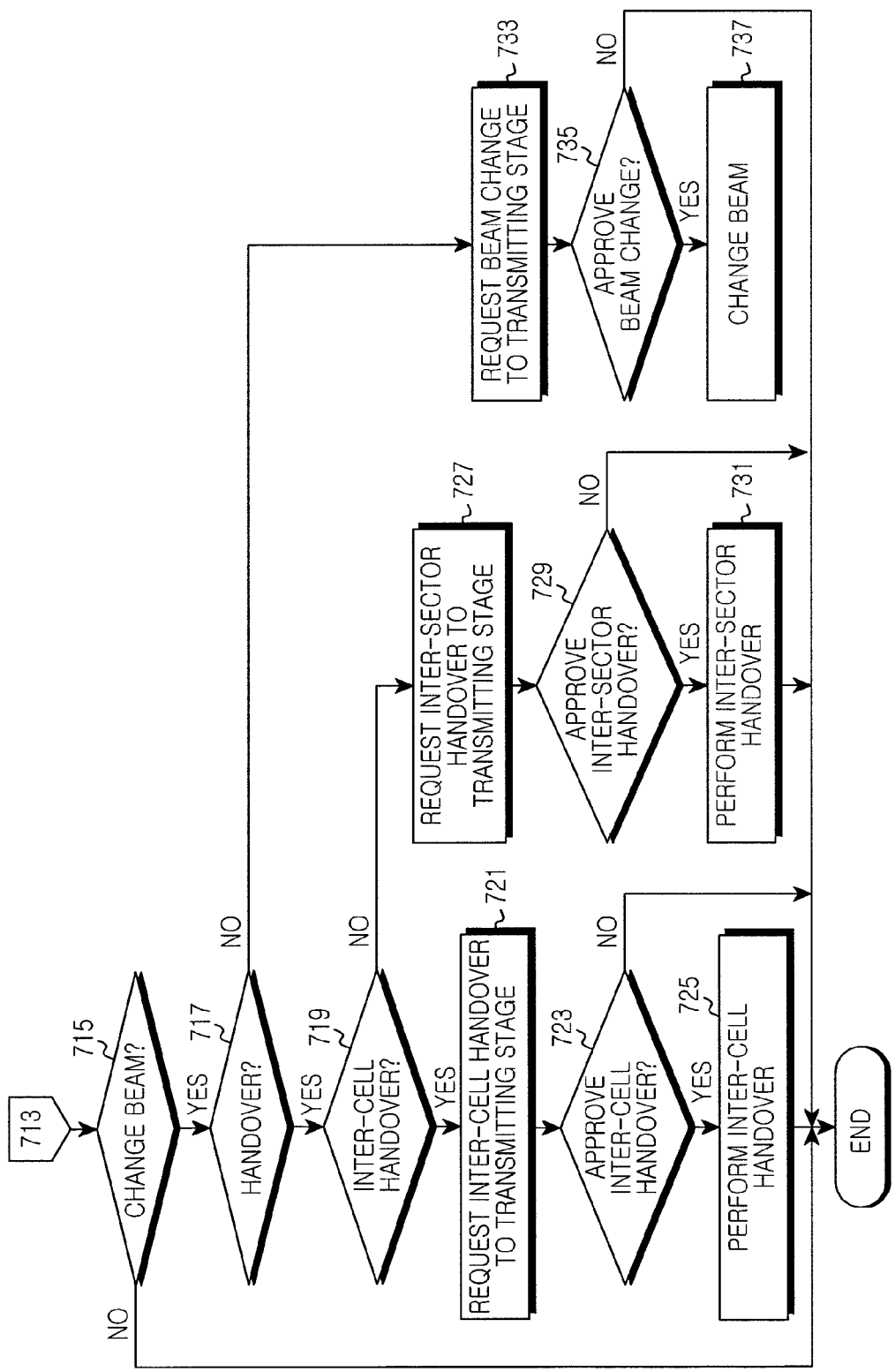
FIG. 8 illustrates a method for changing an optimal beam in a receiving stage of a wireless communication system according to an exemplary embodiment of the present invention.

As such, when the receiving stage 610 selects the optimal transmission beam and requests the inter-beam scheduling to the transmitting stage 600, the receiving stage 610 of the wireless communication system operates as shown in FIGS. 7 and 8.

FIG. 7 illustrates a method for selecting the optimal beam in the receiving stage of the wireless communication system according to an exemplary embodiment of the present invention.

Referring to FIG. 7, the receiving stage obtains the neighboring transmitting stage information received from the transmitting stage in step 701.

In step 703, the receiving stage determines whether the scan event occurs. For example, the receiving stage determines whether the scan event occurs by comparing a signal quality of a serving transmitting stage with the reference value. In so doing, when the signal quality of the serving transmitting stage is smaller than the reference value, the receiving stage determines the scan event. For example, the receiving stage determines whether a preset scan period arrives.

When the scan event does not occur, the receiving stage finishes this process.

In contrast, when the scan event occurs, the receiving stage determines whether to negotiate with the transmitting stage about the scan information in step 705. For example, the receiving stage determines whether to adopt a scan scheme which does not negotiate with the transmitting stage about the scan information, such as autonomous scanning, background scanning, and uncoordinated scanning, or a scan scheme which negotiates with the transmitting stage about the scan information, such as coordinated scanning.

When not negotiating with the transmitting stage about the scan information in step 705, the receiving stage estimates the channel of the transmission beam using the scanning in step 709. In so doing, the receiving stage estimates the channel of each transmission beam by receiving the reference signal from the transmitting stage over each transmission beam. When the receiving stage supports the reception beamforming, it estimates the channel information of the transmission beams of the transmitting stage per reception beam supportable.

In contrast, when negotiating with the transmitting stage about the scan information in step 705, the receiving stage negotiates with the transmitting stage about the scan information in step 707. For example, when the scan event occurs, the receiving stage sends the scan request message to the transmitting stage. The transmitting stage sends the response message of the scan request of the receiving stage to the receiving stage. In so doing, the receiving stage and the transmitting stage exchange the scanning profile information (including at least one of scanning period, scanning duration, and scanning interleaving interval) using the scan request message and the scan response message.

In step 709, the receiving stage estimates the channel information (status or quality) of the transmission beams through the scanning. The receiving stage estimates the channel information (channel status or channel quality) of each transmission beams by receiving the reference signal from the transmitting stage over each transmission beam. When the receiving stage supports the reception beamforming, the receiving stage estimates the channel information of the transmission beams of the transmitting stage per reception beam supportable.

In step 711, the receiving stage transmits the channel information of the transmission beams to the transmitting stage. For example, the receiving stage feeds the channel information of all of the estimated transmission beams back to the transmitting stage. For example, the receiving stage can feed only the channel information of the M-ary transmission beams of good channel condition, back to the transmitting stage. For example, the receiving stage may feed only the channel information of the P-ary transmission beams having the channel condition meeting the reference criteria, back to the transmitting stage. When the receiving stage supports the reception beamforming, it feeds the channel status information of the transmission beams for the respective reception beams, back to the transmitting stage.

In step 713, the receiving stage selects the transmission beam for achieving the optimal transmission efficiency with the transmitting stage by considering the channel information of the transmission beams. For example, the receiving stage selects the transmission beam for achieving the optimal spectral efficiency with the transmitting stage by considering the channel information and the load information of the transmission beams. For example, when the receiving stage supports the reception beamforming, the receiving stage selects the transmission beam for the reception beam to achieve the optimal spectral efficiency with the transmitting stage by considering the channel information of the transmission beams for the reception beams. For example, when the receiving stage supports the reception beamforming, the receiving stage selects the transmission beam for the reception beam to achieve the optimal spectral efficiency with the transmitting stage by considering the channel information and the load information of the transmission beams for the reception beams. In so doing, the receiving stage can obtain the load information of the transmission beam from the load information of the reference signal received to estimate the channel information of the transmission beams in step 709.

Next, the receiving stage requests the inter-beam scheduling by considering the ID information of the optimal transmission beam selected in step 713, as shown in FIG. 8.

FIG. 8 illustrates a method for changing the optimal beam in the receiving stage of the wireless communication system according to an exemplary embodiment of the present invention.

Referring to FIG. 8, after selecting the transmission beam for achieving the optimal spectral efficiency with the transmitting stage in step 713 of FIG. 7, the receiving stage determines whether the transmission beam of the transmitting stage is changed by considering the ID information of the optimal transmission beam in step 715. For example, the receiving stage determines whether the transmission beam is changed by comparing the ID information of the transmission beam selected in step 713 with the ID information of the transmission beam used by the transmitting stage and the receiving stage.

When the ID information of the transmission beam selected in step 713 is the same as the ID information of the transmission beam used by the transmitting stage and the receiving stage, the receiving stage recognizes that the transmission beam of the transmitting stage is not changed. Hence, the receiving stage finishes this process.

In contrast, when the ID information of the transmission beam selected in step 713 is different from the ID information of the transmission beam used by the transmitting stage and the receiving stage, the receiving stage recognizes that the transmission beam of the transmitting stage is changed. Thus, the receiving stage determines whether the handover is required in step 717. For example, the receiving stage determines whether the transmission beam selected in step 713 and the transmission beam used by the transmitting stage and the receiving stage have the same cell ID information and the same sector ID information.

When the transmission beam selected in step 713 and the transmission beam used by the transmitting stage and the receiving stage have different cell ID information and different sector ID information, the receiving stage recognizes that the handover is conducted. Accordingly, the receiving stage determines whether the inter-cell handover is required in step 719. For example, the receiving stage determines whether the transmission beam selected in step 713 and the transmission beam used by the transmitting stage and the receiving stage have the same cell ID information.

When the transmission beam selected in step 713 and the transmission beam used by the transmitting stage and the receiving stage have different cell ID information, the receiving stage recognizes the inter-cell handover. Hence, the receiving stage requests the inter-cell handover to the transmitting stage in step 721. In so doing, the receiving stage may also transmit the information of the transmission beam, which is selected in step 713, for achieving the optimal spectral efficiency with the transmitting stage.

In step 723, the receiving stage determines whether the transmitting stage approves the inter-cell handover request. For example, the receiving stage determines whether the response signal of the inter-cell handover request, which is received from the transmitting stage, includes inter-cell handover approval information.

When the transmitting stage does not approve the inter-cell handover request in step 723, the receiving stage finishes this process.

In contrast, when the transmitting stage approves the inter-cell handover request in step 723, the receiving stage processes the inter-cell handover with the transmitting stage in step 725.

In the meantime, when the transmission beam selected by the receiving stage in step 713 and the transmission beam used by the transmitting stage and the receiving stage have the same cell ID information and the different sector ID information in step 719, the receiving stage recognizes the inter-sector handover. Hence, the receiving stage requests the inter-sector handover to the transmitting stage in step 727. In so doing, the receiving stage may also transmit the information of the transmission beam, which is selected in step 713, for achieving the optimal transmission efficiency with the transmitting stage.

In step 729, the receiving stage determines whether the transmitting stage approves the inter-sector handover request. For example, the receiving stage determines whether the response signal of the inter-sector handover request, which is received from the transmitting stage, includes inter-sector handover approval information.

When the transmitting stage does not approve the inter-sector handover request in step 729, the receiving stage finishes this process.

In contrast, when the transmitting stage approves the inter-sector handover request in step 729, the receiving stage processes the inter-sector handover with the transmitting stage in step 731.

In the meantime, when the transmission beam selected by the receiving stage in step 713 and the transmission beam used by the transmitting stage and the receiving stage have the same cell ID information and the same sector ID information in step 717, the receiving stage recognizes the beam change without the handover. Hence, the receiving stage requests the beam change to the transmitting stage in step 733. In so doing, the receiving stage may also transmit the information of the transmission beam, which is selected in step 713, for achieving the optimal spectral efficiency with the transmitting stage.

In step 735, the receiving stage determines whether the transmitting stage approves the beam change request. For example, the receiving stage determines whether the response signal of the beam change request, which is received from the transmitting stage, includes beam change approval information.

When the transmitting stage does not approve the beam change request in step 735, the receiving stage finishes this process.

In contrast, when the transmitting stage approves the beam change request in step 735, the receiving stage processes the beam change with the transmitting stage in step 737.

Next, the receiving stage finishes process.

Figure 9:
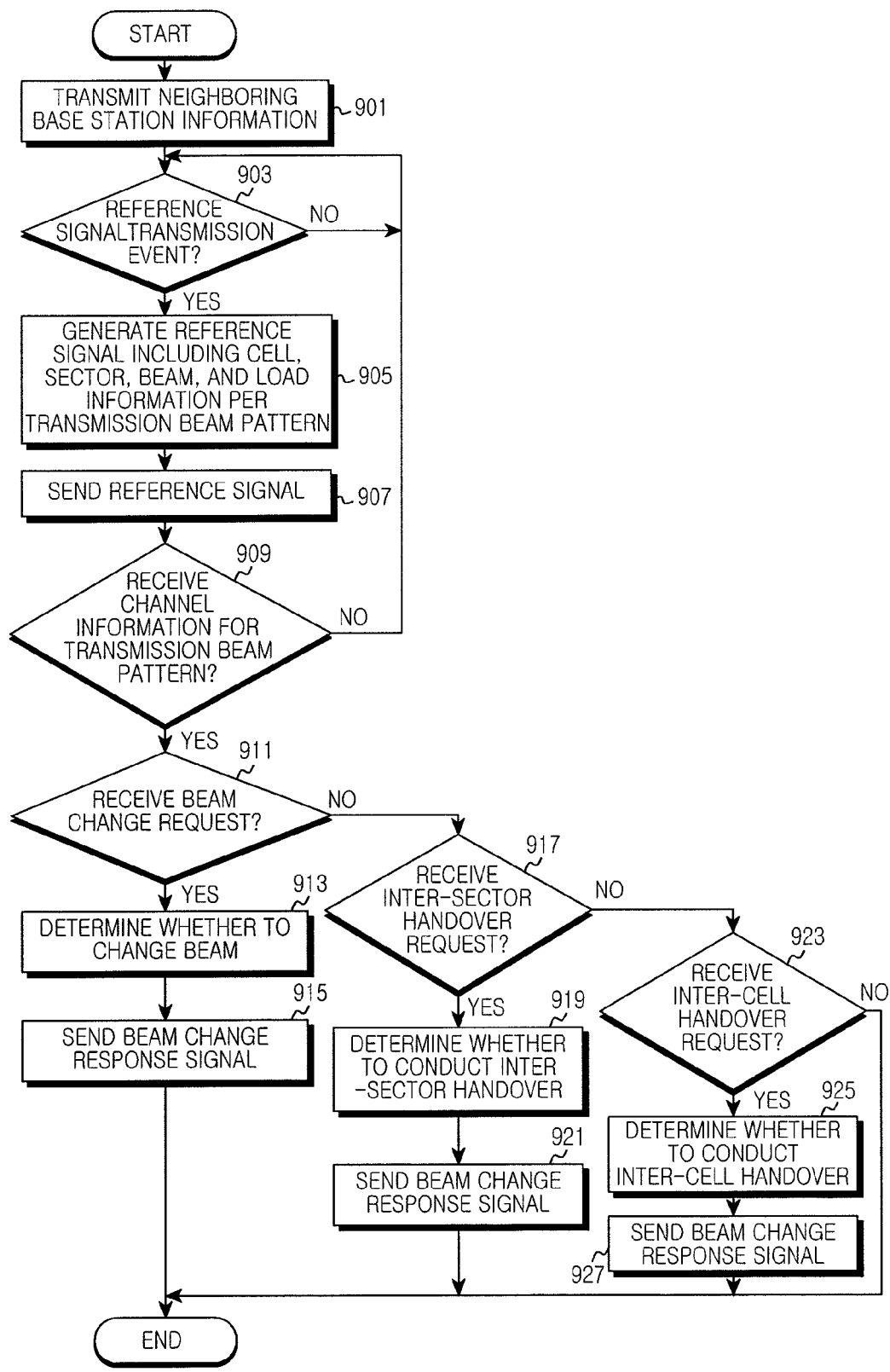
FIG. 9 illustrates a method for changing a beam in a transmitting stage of a wireless communication system according to an exemplary embodiment of the present invention.

As above, when the receiving stage selects the optimal transmissions beam and requests the inter-beam scheduling to the transmitting stage, the transmitting stage of the wireless communication system operates as shown in FIG. 9.

FIG. 9 illustrates a method for changing a beam in a transmitting stage of a wireless communication system according to an exemplary embodiment of the present invention.

Referring to FIG. 9, the transmitting stage sends the message NBR-INFO including the neighboring transmitting stage information in step 901. In so doing, the transmitting stage broadcasts the message including the neighboring transmitting stage information.

In step 903, the transmitting stage determines whether a reference signal transmission event occurs. For example, the transmitting stage determines whether a reference signal transmission period arrives. For example, the transmitting stage determines whether the receiving stage requests the reference signal transmission for the scanning. If a reference signal transmission event is determined to have not occurred, the transmitting stage continues to monitor for an occurrence of a reference signal transmission event.

When the reference signal transmission event occurs, the transmitting stage generates the reference signal to transmit through the transmission beams supported by the transmitting stage in step 905. For example, when the cell of the transmitting stage is divided into the plurality of the sectors, the transmitting stage generates the reference signal including at least one of the cell ID information 200, the sector ID information 210, the beam ID information 220, and the beam load information 230 as shown in FIG. 2.

In step 907, the transmitting stage transmits the reference signal through the transmission beams.

In step 909, the transmitting stage determines whether the channel information of the transmission beam is received from the receiving stage. If the channel information of the transmission beam is not received from the receiving stage, then the process returns to step 903.

Upon receiving the channel information of the transmission beam, the transmitting stage determines whether a beam change request signal is received from the receiving stage in step 911.

When receiving the beam change request signal from the receiving stage, the transmitting stage determines whether to support the beam change requested by the receiving stage in step 913.

In step 915, the transmitting stage sends to the receiving stage a beam change response signal including the information about whether to support the beam change of the receiving stage. When supporting the beam change requested by the receiving stage, the transmitting stage processes the beam change with the receiving stage, which is not illustrated here. For example, the transmitting stage performs the beam change process with the receiving stage by selecting the transmission beam for achieving the optimal transmission efficiency in consideration of the channel information of the transmission beams provided from the receiving stage. For example, the transmitting stage may perform the beam change process with the receiving stage by taking into account the transmission beam for achieving the optimal transmission efficiency provided from the receiving stage.

When the transmitting stage determines that a beam change request signal has not been received from the receiving stage in step 911, the transmitting stage determines whether an inter-sector handover request signal is received from the receiving stage in step 917.

Upon receiving the inter-sector handover request signal from the receiving stage, the transmitting stage determines whether to support the inter-sector handover requested by the receiving stage in step 919.

In step 921, the transmitting stage transmits to the receiving stage an inter-sector handover response signal including the information about whether to support the inter-sector handover of the receiving stage. When supporting the inter-sector handover requested by the receiving stage, the transmitting stage processes the inter-sector handover with the receiving stage, which is not illustrated here. For example, the transmitting stage conducts the inter-sector handover process with the receiving stage by selecting the transmission beam for achieving the optimal transmission efficiency in consideration of the channel information of the transmission beam provided from the receiving stage. For example, the transmitting stage may conduct the inter-sector handover with the receiving stage by considering the transmission beam for achieving the optimal transmission efficiency provided from the receiving stage.

When the transmitting stage determines that an inter-sector handover request signal has not been received from the receiving stage in step 917, the transmitting stage determines whether an inter-cell handover request signal is received from the receiving stage in step 923.

Upon receiving the inter-cell handover request signal from the receiving stage, the transmitting stage determines whether to support the inter-cell handover requested by the receiving stage in step 925.

In step 927, the transmitting stage transmits to the receiving stage an inter-cell handover response signal including the information about whether to support the inter-cell handover of the receiving stage. When supporting the inter-cell handover requested by the receiving stage, the transmitting stage processes the inter-cell handover with the receiving stage, which is not illustrated here. For example, the transmitting stage conducts the inter-cell handover process with the receiving stage by selecting the transmission beam for achieving the optimal transmission efficiency in consideration of the channel information of the transmission beam provided from the receiving stage. For example, the transmitting stage may conduct the inter-cell handover with the receiving stage by considering the transmission beam for achieving the optimal transmission efficiency provided from the receiving stage.

When the transmitting stage determines that an inter-cell handover request signal has not been received during a reference time in step 923, the transmitting stage recognizes that the transmission beam of the receiving stage is not changed. Hence, the transmitting stage finishes this process.

In this exemplary embodiment of the present invention, the receiving stage selects the optimal transmission beam and requests the inter-beam scheduling to the transmitting stage.

Figure 10:
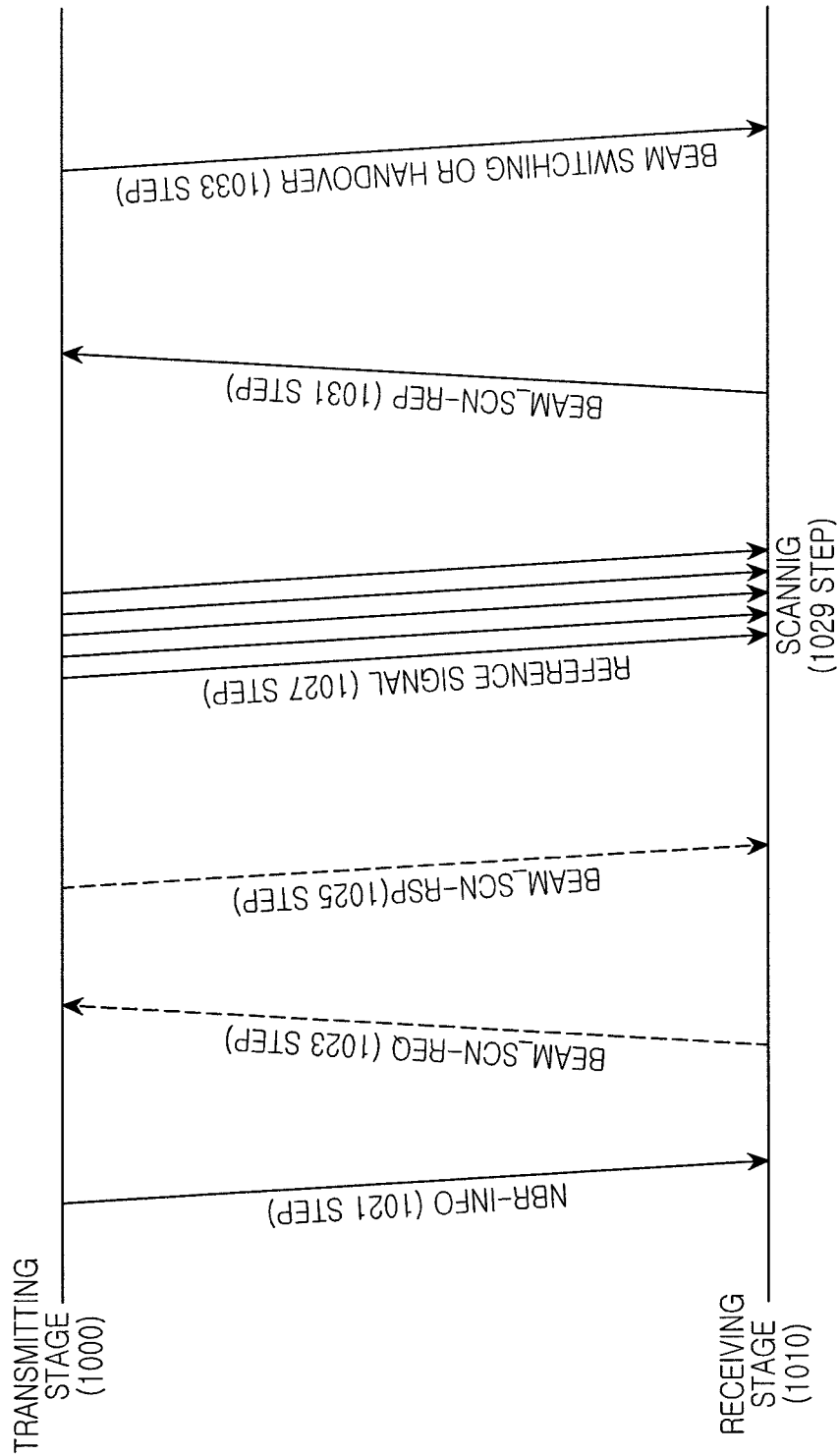
FIG. 10 illustrates a method for selecting and changing an optimal beam in a wireless communication system according to another exemplary embodiment of the present invention.

When the transmitting stage selects the optimal transmission beam and performs the inter-beam scheduling according to another exemplary embodiment of the present invention, the wireless communication system operates as shown in FIG. 10.

FIG. 10 illustrates a method for selecting and changing an optimal beam in a wireless communication system according to another exemplary embodiment of the present invention. Herein, the receiving stage is assumed to negotiate with the transmitting stage about the scan information.

Referring to FIG. 10, to support the scanning of a receiving stage 1010, a transmitting stage 1000 sends the message NBR-INFO including the neighboring transmitting stage information in step 1021. In so doing, the transmitting stage 1000 broadcasts the message including the neighboring transmitting stage information.

When the scan event occurs, the receiving stage 1010 sends the scan request message Beam_SCAN-REQ to the transmitting stage 1000 in step 1023. The transmitting stage 1000 sends the response message Beam_SCAN-RSP to the receiving stage 1010 in response to the scan request of the receiving stage 1010 in step 1025. Using the scan request message and the scan response message, the receiving stage 1010 and the transmitting stage 1000 exchange the scanning profile information.

The transmitting stage 1000 transmits the reference signal through the supportable transmission beams in step 1027. Herein, the reference signal includes at least one of the cell ID information 200, the sector ID information 210, the beam ID information 220, and the beam load information 230 as shown in FIG. 2.

The receiving stage 1010 estimates the channels of the transmission beams according to the scan information negotiated with the transmitting stage 1000 by receiving the reference signal from the transmitting stage 1000 through the transmission beams in step 1029. When the receiving stage 1010 supports the reception beamforming, it estimates the channel information of the transmission beams of the transmitting stage per reception beam supportable.

In step 1031, the receiving stage 1010 sends a report Beam_SCAN-REP of the channel information of the transmission beams to the transmitting stage 1000.

The transmitting stage 1000 selects the transmission beam for achieving the optimal transmission efficiency with the receiving stage 1010 by considering the channel information of the transmission beams provided from the receiving stage 1010. For example, the transmitting stage 1000 selects the transmission beam for achieving the optimal transmission efficiency with the receiving stage 1010 by considering the channel information of the transmission beams provided from the receiving stage 1010 and the load information of the transmission beams. For example, when the receiving stage 1010 supports the reception beamforming, the transmitting stage 1000 selects the transmission beam for the reception beam to achieve the optimal transmission efficiency with the receiving stage 1010 by considering the channel information of the transmission beams for the reception beams provided from the receiving stage 1010. For example, when the receiving stage 1010 supports the reception beamforming, the transmitting stage 1000 selects the transmission beam for the reception beam to achieve the optimal transmission efficiency with the receiving stage 1010 by considering the channel information of the transmission beams for the reception beams provided from the receiving stage 1010 and the load information of the transmission beams.

In step 1033, the transmitting stage 1000 performs the inter-beam scheduling by considering the ID information of the optimal transmission beam. For example, when the transmission beam selected by the transmitting stage 1000 belongs to the same cell and the same sector as the transmission beam being used by the transmitting stage 1000 and the receiving stage 1010, the transmitting stage 1000 conducts the intra-sector inter-beam switching as shown in FIG. 3A. For example, when the transmission beam selected by the transmitting stage 1000 belongs to the different sector of the same cell as the transmission beam used by the transmitting stage 1000 and the receiving stage 1010, the transmitting stage 1000 performs the intra-cell inter-sector handover as shown in FIG. 3B. For example, when the transmission beam selected by the transmitting stage 1000 belongs to the different cell from the transmission beam used by the transmitting stage 1000 and the receiving stage 1010, the transmitting stage 1000 conducts the inter-cell handover as shown in FIG. 3C.

Figure 11:
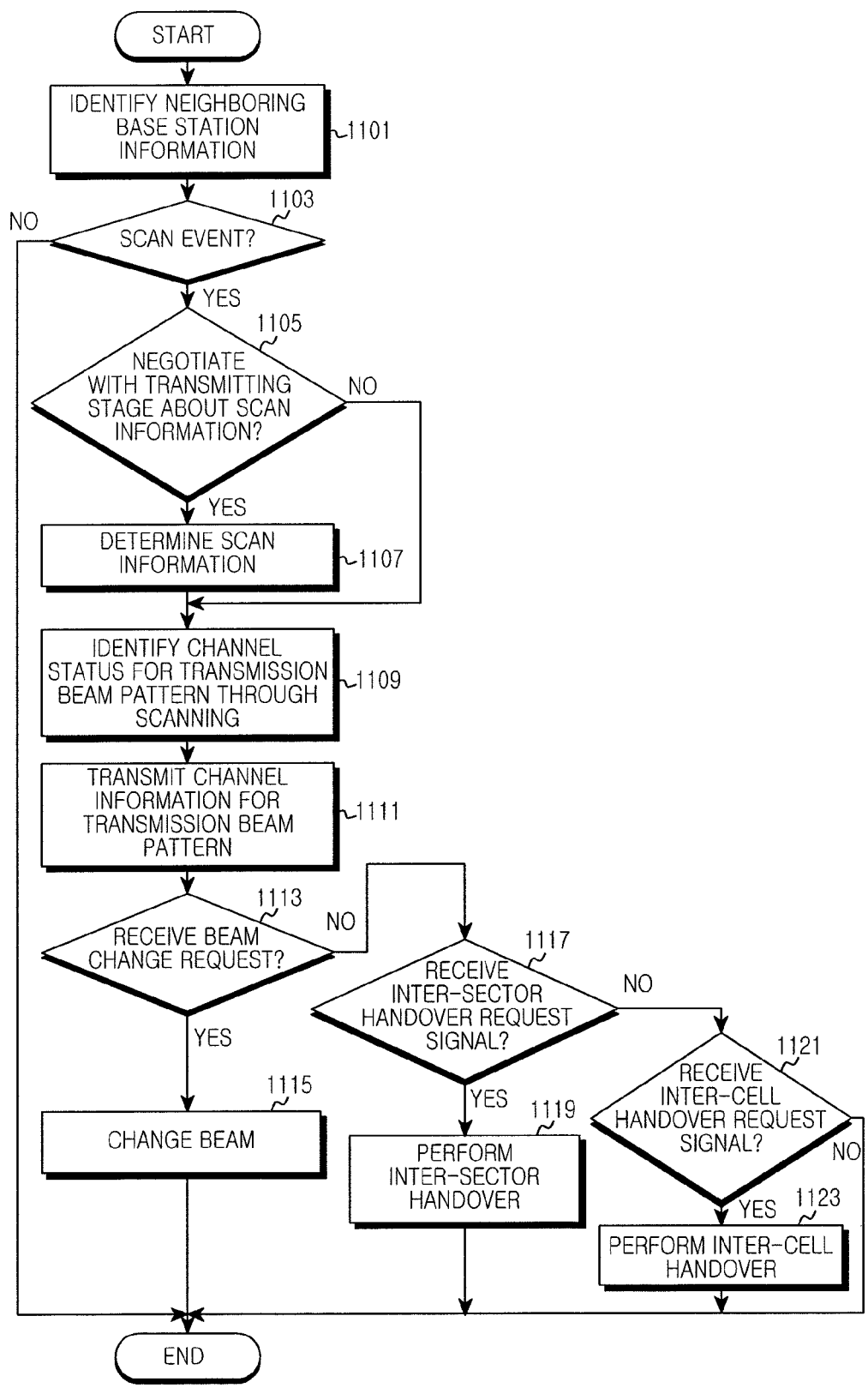
FIG. 11 illustrates a method for changing a beam in a receiving stage of a wireless communication system according to an exemplary embodiment of the present invention.

As such, when the transmitting stage 1000 selects the optimal transmission beam and conducts the inter-beam scheduling, the receiving stage 1010 of the wireless communication system operates as shown in FIG. 11.

FIG. 11 illustrates a method for changing a beam in a receiving stage of a wireless communication system according to an exemplary embodiment of the present invention.

Referring to FIG. 11, the receiving stage obtains the neighboring transmitting stage information received from the transmitting stage in step 1101.

In step 1103, the receiving stage determines whether the scan event occurs. For example, the receiving stage determines whether the scan event occurs by comparing the signal quality of the serving transmitting stage with the reference value. In so doing, when the signal quality of the serving transmitting stage is smaller than the reference value, the receiving stage recognizes the scan event. For example, the receiving stage determines whether the preset scan period arrives.

When the scan event does not occur, the receiving stage finishes this process.

In contrast, when the scan event occurs, the receiving stage determines whether to negotiate with the transmitting stage about the scan information in step 1105. For example, the receiving stage determines whether to adopt the scan scheme which does not negotiate with the transmitting stage about the scan information, such as autonomous scanning, background scanning, and uncoordinated scanning, or the scan scheme which negotiates with the transmitting stage about the scan information, such as coordinated scanning.

When the receiving stage determines not to negotiate with the transmitting stage about the scan information in step 1105, the receiving stage estimates the channel of the transmission beam using the scanning in step 1109. In so doing, the receiving stage estimates the channel of each transmission beam by receiving the reference signal from the transmitting stage over each transmission beam. When the receiving stage supports the reception beamforming, it estimates the channel information of the transmission beams of the transmitting stage per reception beam supportable.

In contrast, when the receiving stage determines to negotiate with the transmitting stage about the scan information in step 1105, the receiving stage negotiates with the transmitting stage about the scan information in step 1107. For example, when the scan event occurs, the receiving stage sends the scan request message to the transmitting stage. The transmitting stage sends the response message of the scan request of the receiving stage to the receiving stage. In so doing, the receiving stage and the transmitting stage exchange the scanning profile information using the scan request message and the scan response message.

In step 1109, the receiving stage estimates the channel information (channel status or channel quality) of the transmission beam through the scanning. The receiving stage estimates the channel information (channel status or channel quality) of each transmission beam by receiving the reference signal from the transmitting stage over each transmission beam. When the receiving stage supports the reception beamforming, the receiving stage estimates the channel information of the transmission beams of the transmitting stage per reception beam supportable.

In step 1111, the receiving stage transmits the channel information of the transmission beam to the transmitting stage. For example, the receiving stage feeds the channel information of all of the estimated transmission beams back to the transmitting stage. For example, the receiving stage can feed only the channel information of the M-ary transmission beams of good channel condition, back to the transmitting stage. For example, the receiving stage may feed only the channel information of the P-ary transmission beams having the channel condition meeting the reference criteria, back to the transmitting stage. When the receiving stage supports the reception beamforming, it feeds the channel status information of the transmission beams for the respective reception beams, back to the transmitting stage.

In step 1113, the receiving stage determines whether the beam change request signal is received from the transmitting stage.

Upon receiving the beam change request signal from the transmitting stage, the receiving stage processes the beam change with the transmitting stage in step 1115.

In contrast, when the receiving stage determines that a beam change request signal has not been received from the transmitting stage in step 1113, the receiving stage determines whether the inter-sector handover request signal is received from the transmitting stage in step 1117.

When the receiving stage determines that an inter-sector handover request signal has been received from the transmitting stage, the receiving stage processes the inter-sector handover with the transmitting stage in step 1119.

In contrast, when the receiving stage determines that an inter-sector handover request signal has not been received from the transmitting stage in step 1117, the receiving stage determines whether the inter-cell handover request signal is received from the transmitting stage in step 1121.

Upon receiving the inter-cell handover request signal from the transmitting stage, the receiving stage processes the inter-cell handover with the transmitting stage in step 1123.

In contrast, when the receiving stage determines that an inter-cell handover request signal has not been received from the transmitting stage over the reference time in step 1121, the receiving stage recognizes no transmission change of the transmitting stage. Accordingly, the receiving stage finishes this process.

Figure 12:
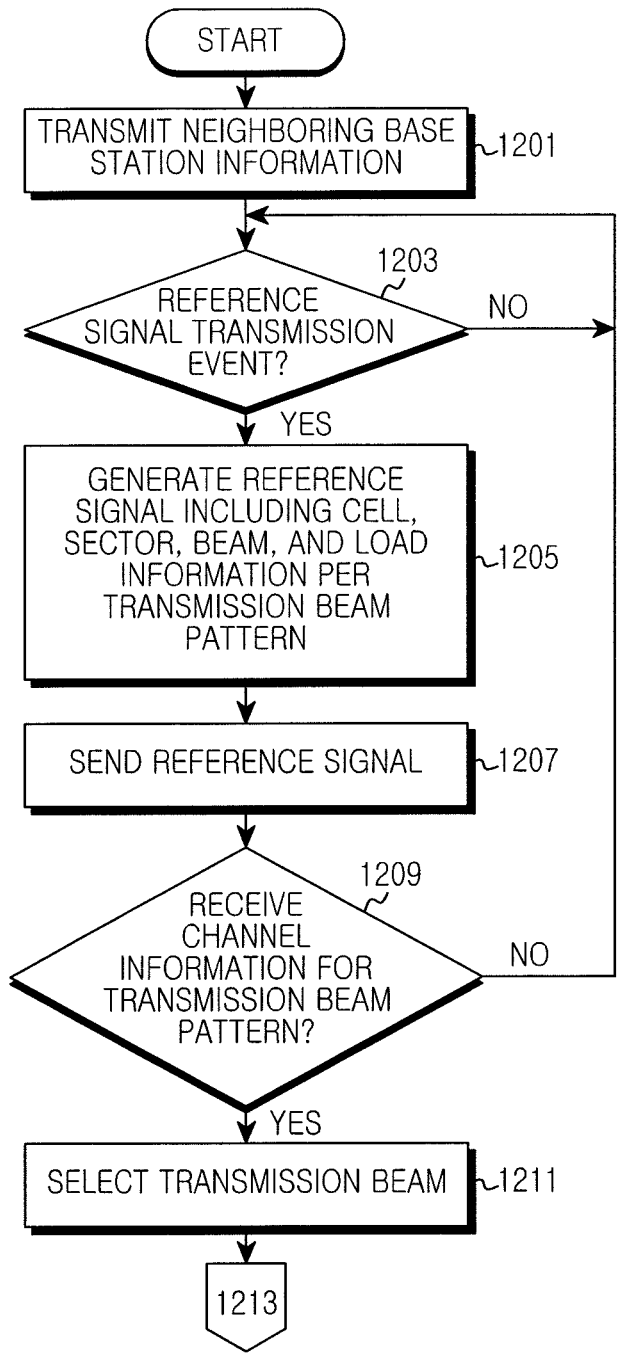
FIG. 12 illustrates a method for selecting an optimal beam in a transmitting stage of a wireless communication system according to an exemplary embodiment of the present invention.
Figure 13:
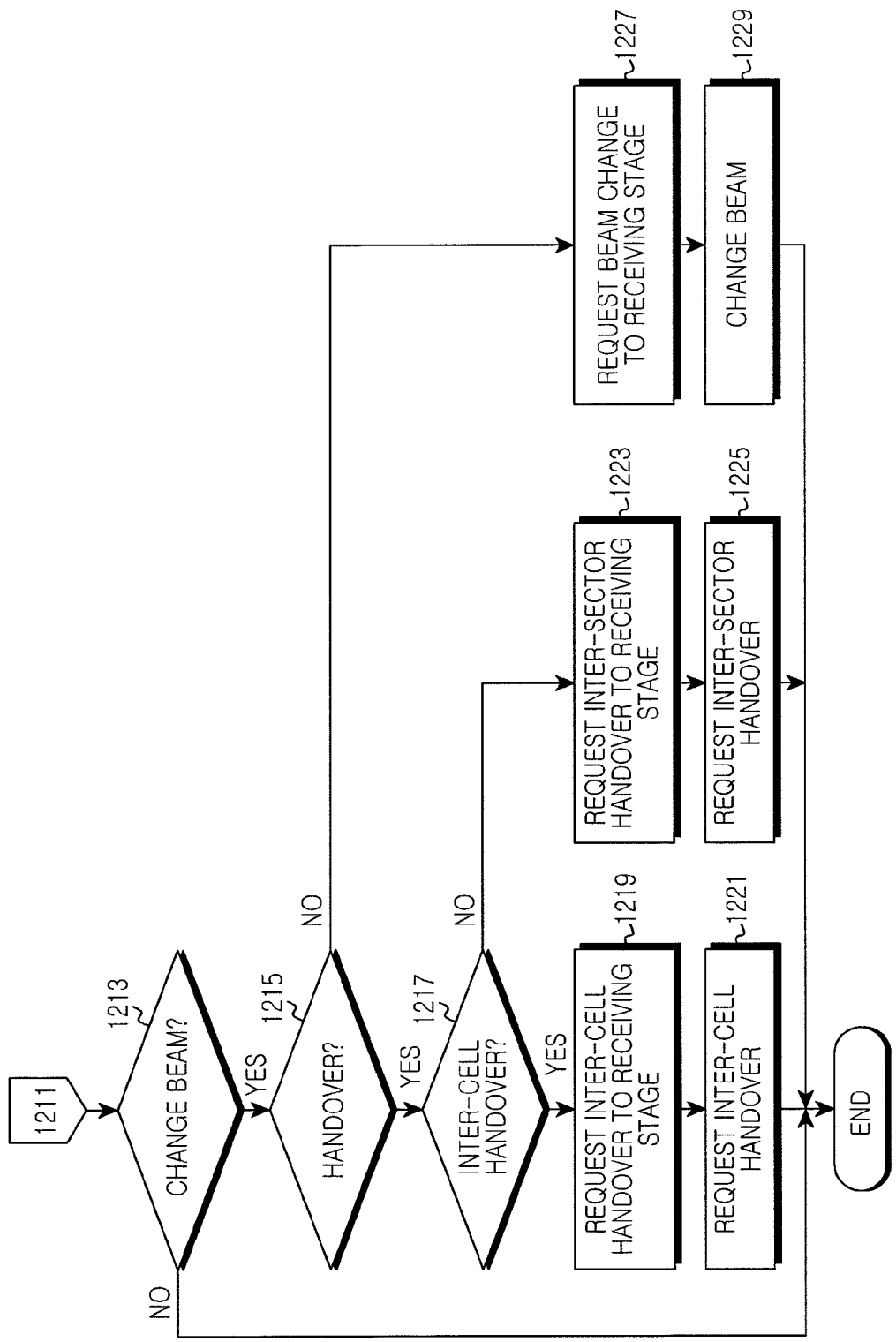
FIG. 13 illustrates a method for changing an optimal beam in a transmitting stage of a wireless communication system according to an exemplary embodiment of the present invention.

As above, when the transmitting stage selects the optimal transmission beam and performs the inter-beam scheduling, the transmitting stage of the wireless communication system operates as shown in FIGS. 12 and 13.

FIG. 12 illustrates a method for selecting an optimal beam in a transmitting stage of a wireless communication system according to an exemplary embodiment of the present invention.

Referring to FIG. 12, the transmitting stage sends the message NBR-INFO including the neighboring transmitting stage information in step 1201. In so doing, the transmitting stage broadcasts the message including the neighboring transmitting stage information.

In step 1203, the transmitting stage determines whether the reference signal transmission event occurs. For example, the transmitting stage determines whether the reference signal transmission period arrives. For example, the transmitting stage determines whether the receiving stage requests the reference signal transmission for the scanning.

When the reference signal transmission event occurs, the transmitting stage generates the reference signal to transmit through the transmission beams supported by the transmitting stage in step 1205. For example, when the cell of the transmitting stage is divided into the plurality of the sectors, the transmitting stage generates the reference signal to include the ID information including the cell ID information 200, the sector ID information 210, the beam ID information 220, and the beam load information 230 as shown in FIG. 2. For example, when the cell of the transmitting stage is not divided into the sectors, the transmitting stage may generate the reference signal to include the ID information including the cell ID information 200, the beam ID information 220, and the beam load information 230.

In step 1207, the transmitting stage transmits the reference signal through the transmission beams.

In step 1209, the transmitting stage determines whether the channel information of the transmission beams is received from the receiving stage.

If the transmitting stage determines that the channel information of the transmission beams is not received from the receiving stage, then the process proceeds to step 1203.

Upon receiving the channel information of the transmission beams, the transmitting stage selects the transmission beam for achieving the optimal spectral efficiency with the receiving stage by considering the channel information of the transmission beams provided from the receiving stage in step 1211. For example, the transmitting stage selects the transmission beam for achieving the optimal spectral efficiency with the receiving stage by considering the channel information of the transmission beams provided from the receiving stage and the load information of the transmission beams. For example, when the receiving stage supports the reception beamforming, the transmitting stage selects the transmission beam for the reception beam to achieve the optimal spectral efficiency with the receiving stage by considering the channel information of the transmission beams for the reception beams provided from the receiving stage. For example, when the receiving stage supports the reception beamforming, the transmitting stage selects the transmission beam for the reception beam to achieve the optimal spectral efficiency with the receiving stage by considering the channel information of the transmission beams for the reception beams provided from the receiving stage and the load information of the transmission beams.

Next, the transmitting stage performs the inter-beam scheduling by considering the ID information of the optimal transmission beam selected in step 1211, as shown in FIG. 13.

FIG. 13 illustrates a method for changing an optimal beam in a transmitting stage of a wireless communication system according to an exemplary embodiment of the present invention.

Referring to FIG. 13, after selecting the transmission beam for achieving the optimal spectral efficiency with the receiving stage in step 1211 of FIG. 12, the transmitting stage determines whether the transmission beam with the receiving stage is changed by considering the ID information of the optimal transmission beam in step 1213. For example, the transmitting stage determines whether the transmission beam is changed by comparing the ID information of the transmission beam selected in step 1211 with the ID information of the transmission beam being used by the transmitting stage and the receiving stage.

When the ID information of the transmission beam selected in step 1211 is the same as the ID information of the transmission beam used by the transmitting stage and the receiving stage, the transmitting stage recognizes that the transmission beam of the receiving stage is not changed. Hence, the transmitting stage finishes this process.

In contrast, when the ID information of the transmission beam selected in step 1211 is different from the ID information of the transmission beam used by the transmitting stage and the receiving stage, the transmitting stage recognizes that the transmission beam of the receiving stage is changed. Thus, the transmitting stage determines whether the receiving stage requires the handover in step 1215. For example, the transmitting stage determines whether the transmission beam selected in step 1211 and the transmission beam used by the transmitting stage and the receiving stage have the same cell ID information and the same sector ID information.

When the transmission beam selected in step 1211 and the transmission beam used by the transmitting stage and the receiving stage have different cell ID information and different sector ID information, the transmitting stage recognizes that the receiving stage requires the handover. Accordingly, the transmitting stage determines whether the receiving stage requires the inter-cell handover in step 1217. For example, the transmitting stage determines whether the transmission beam selected in step 1211 and the transmission beam used by the transmitting stage and the receiving stage have the same cell ID information.

When the transmission beam selected in step 1211 and the transmission beam used by the transmitting stage and the receiving stage have different cell ID information, the transmitting stage recognizes that the receiving stage needs the inter-cell handover. Hence, the transmitting stage requests the inter-cell handover to the receiving stage in step 1219. In so doing, the transmitting stage may also transmit the information of the transmission beam, which is selected in step 1211 of FIG. 12, for achieving the optimal spectral efficiency.

In step 1221, the transmitting stage processes the inter-cell handover with the receiving stage.

In the meantime, when the transmission beam selected by the transmitting stage in step 1211 and the transmission beam used by the transmitting stage and the receiving stage have the same cell ID information and the different sector ID information, the transmitting stage recognizes that the receiving stage requires the inter-sector handover. Hence, the transmitting stage requests the inter-sector handover to the receiving stage in step 1223. In so doing, the transmitting stage may also transmit the information of the transmission beam, which is selected in step 1211 of FIG. 2, for achieving the optimal spectral efficiency.

In step 1225, the transmitting stage processes the inter-sector handover with the receiving stage.

When the transmission beam selected by the transmitting stage in step 1211 and the transmission beam used by the transmitting stage and the receiving stage have the same cell ID information and the same sector ID information in step 1215, the transmitting stage recognizes that the receiving stage changes the beam without the handover. Hence, the transmitting stage requests the beam change to the receiving stage in step 1227. In so doing, the transmitting stage may also transmit the information of the transmission beam, which is selected in step 1211 of FIG. 12, for achieving the optimal spectral efficiency.

In step 1229, the transmitting stage processes the beam change with the receiving stage.

Next, the transmitting stage finishes this process.

As set forth above, the transmitting stage of the wireless communication system adopting the beamforming technique transmits the reference signal including at least one of the cell ID information, the sector ID information, the beam ID information, and the beam load information through the transmission beams. Therefore, it is possible to select the optimal transmission beam and reception beam of the best spectral efficiency or to select the optimal transmission beam and reception beam by considering the load based on the number of the allocated mobile stations in comparison with the available resources per beam, and to fulfill the beam change scheduling using the reference signal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a signal in a transmitting stage of a wireless communication system which forms a plurality of beams, the method comprising:
    transmitting a plurality of reference signals through a plurality of transmission beams, to a receiving stage;
    receiving channel information of the plurality of reference signals from the receiving stage;
    selecting a first transmission beam for transmitting a signal to the receiving stage, by considering the channel information of the plurality of reference signals provided from the receiving stage; and
    determining whether to switch from a second transmission beam to the selected first transmission beam, based on beam ID information and at least one of cell ID information and sector ID information of the first transmission beam and the second transmission beam.

2. The method of claim 1, wherein the reference signal comprises at least one of cell ID information, sector ID information, beam ID information, and beam load information.

3. The method of claim 1, wherein the selecting of the first transmission beam comprises:
    selecting the first transmission beam by considering the channel information of the at least one transmission beam provided from the receiving stage, and load information of each transmission beam.

4. The method of claim 1, wherein the selecting of the first transmission beam comprises:
    when the receiving stage supports reception beamforming, selecting the first transmission beam by considering at least one of the channel information of the at least one transmission beam for each reception beam provided from the receiving stage, and load information of each transmission beam.

5. The method of claim 1, wherein the determining whether to switch from the second transmission beam to the selected first transmission beam comprises:
    comparing ID information of the first transmission beam with ID information of the second transmission beam; and
    when the first transmission beam and the second transmission beam have the same cell ID information and sector ID information and have different beam ID information, changing the transmission beam for the receiving stage,
    wherein the second transmission beam comprises a beam used to transmit the signal to the receiving stage.

6. The method of claim 5, wherein the determining whether to switch from the second transmission beam to the selected first transmission beam comprises:
    when the first transmission beam and the second transmission beam have different cell ID information, performing inter-cell handover for the receiving stage.

7. The method of claim 5, wherein the determining whether to switch from the second transmission beam to the selected first transmission beam comprises:
    when the first transmission beam and the second transmission beam have the same cell ID information and the different sector ID information, performing inter-sector handover for the receiving stage.

8. An apparatus of a transmitting stage of a wireless communication system which forms a plurality of beams, the apparatus comprising:
    at least one antenna comprising a plurality of antenna elements;
    a receiver for receiving channel information of a plurality of reference signals which are transmitted through a plurality of transmission beams from a receiving stage;
    a beam setter for selecting a first transmission beam for transmitting a signal to the receiving stage, by considering the channel information of the plurality of reference signals provided from the receiving stage through the receiver;
    a controller for controlling to transmit the plurality of reference signals through the plurality of transmission beams, and for determining whether to switch from a second transmission beam to the first transmission beam selected by the beam setter, based on beam ID information and at least one of cell ID information and sector ID information of the first transmission beam and the second transmission beam; and a plurality of Radio Frequency (RF) paths connected to the respective antenna elements, for forming the beam to transmit the reference signals having the plurality of different transmission beams and to transmit a signal to the receiving stage using the first transmission beam selected by the beam setter.

9. The apparatus of claim 8, wherein the reference signal comprises at least one of cell ID information, sector ID information, beam ID information, and beam load information.

10. The apparatus of claim 8, wherein the beam setter selects the first transmission beam by considering the channel information of the at least one transmission beam provided from the receiving stage, and load information of each transmission beam.

11. The apparatus of claim 8, wherein, when the receiving stage supports reception beamforming, the beam setter selects the first transmission beam by considering at least one of the channel information of the at least one transmission beam for each reception beam provided from the receiving stage, and load information of each transmission beam.

12. The apparatus of claim 8, wherein, when the first transmission beam and the second transmission beam have the same cell ID information and sector ID information and have different beam ID information, the controller changes the beam for the receiving stage, and
wherein the second transmission beam comprises the beam used to transmit the signal to the receiving stage.

13. The apparatus of claim 12, wherein, when the first transmission beam and the second transmission beam have different cell ID information, the controller performs inter-cell handover for the receiving stage.

14. The apparatus of claim 12, wherein, when the first transmission beam and the second transmission beam have the same cell ID information and the different sector ID information, the controller performs inter-sector handover for the receiving stage.

15. A method for confirming channel information of a beam in a receiving stage of a wireless communication system which forms a plurality of beams, the method comprising:
receiving a plurality of reference signals including a plurality of transmission beams from a transmitting stage;
estimating a channel of the plurality of reference signals received through of the plurality of transmission beams;
selecting a first transmission beam to be used by the transmitting stage to transmit a signal, by considering each channel information of the plurality of reference signals; and
requesting a switch from a second transmission beam to the selected first transmission to the transmitting stage, based on beam ID information and at least one of cell ID information and sector ID information of the first transmission beam and the second transmission beam.

16. The method of claim 15, wherein the reference signal comprises at least one of cell ID information, sector ID information, beam ID information, and beam load information.

17. The method of claim 15, wherein the selecting of the first transmission beam comprises:
selecting the first transmission beam by considering the channel information of the plurality of reference signals and load information of each transmission beam.

18. The method of claim 15, wherein the selecting of the first transmission beam comprises:
when the receiving stage supports reception beamforming, selecting the first transmission beam by considering at least one of the channel information of the at least one transmission beam for each reception beam, and load information of each transmission beam.

19. The method of claim 15, wherein the requesting a switch from the second transmission beam to the selected first transmission comprises:
comparing ID information of the first transmission beam with ID information of the second transmission beam; and
when the first transmission beam and the second transmission beam have the same cell ID information and sector ID information and have different beam ID information, requesting beam change to the transmitting stage,
wherein the second transmission beam comprises a beam used to transmit the signal to the receiving stage.

20. The method of claim 19, wherein the requesting a switch from the second transmission beam to the selected first transmission comprises:
when the first transmission beam and the second transmission beam have different cell ID information, requesting inter-cell handover to the transmitting stage.

21. The method of claim 19, wherein the requesting a switch from the second transmission beam to the selected first transmission comprises:
when the first transmission beam and the second transmission beam have the same cell ID information and have the different sector ID information, requesting inter-sector handover to the transmitting stage.

22. The method of claim 15, further comprising:
after estimating the channel of the plurality of reference signals feeding channel information of each of the plurality of reference signals back to the transmitting stage.

23. An apparatus of a receiving stage of a wireless communication system which forms a plurality of beams, the apparatus comprising:
a receiver for receiving a plurality of reference signals including a plurality of different transmission beams from a transmitting stage;
a channel estimator for estimating a channel of the plurality of reference signals; and
a controller for selecting a first transmission beam to be used by a transmitting stage to transmit a signal, by considering channel information of the plurality of reference signals, and for requesting a switch from a second transmission beam to the selected first transmission to the transmitting stage, based on beam ID information and at least one of cell ID information and sector ID information of the first transmission beam and the second transmission beam.

24. The apparatus of claim 23, wherein the reference signal comprises at least one of cell ID information, sector ID information, beam ID information, and beam load information.

25. The apparatus of claim 23, wherein the controller selects the first transmission beam by considering the channel information of the plurality of and load information in the reference signal of each transmission beam.

26. The apparatus of claim 23, wherein, when the receiving stage supports reception beamforming, the controller selects the first transmission beam by considering at least one of the channel information of the at least one transmission beam for each reception beam, and load information in the reference signal of each transmission beam.

27. The apparatus of claim 23, wherein, when the first transmission beam and the second transmission beam have the same cell ID information and sector ID information and different beam ID information, the controller requests beam change the transmitting stage, and the second transmission beam comprises a beam used to transmit the signal to the receiving stage.

28. The apparatus of claim 27, wherein, when the first transmission beam and the second transmission beam have different cell ID information, the controller requests inter-cell handover to the transmitting stage.

29. The apparatus of claim 27, wherein, when the first transmission beam and the second transmission beam have the same cell ID information and have the different sector ID information, the controller requests inter-sector handover to the transmitting stage.

30. The apparatus of claim 23, wherein the controller feeds channel information of the plurality of reference signals back to the transmitting stage.

* * * * *